United States Patent
Nakatani et al.

(10) Patent No.: US 9,756,225 B2
(45) Date of Patent: Sep. 5, 2017

(54) IMAGE-PROCESSING DEVICE AND CONTROL METHOD THEREOF

(71) Applicant: CANON KABUSHIKI KAISHA, Tokyo (JP)

(72) Inventors: Toshiki Nakatani, Kawasaki (JP); Izumi Kanai, Machida (JP); Yohei Sekiguchi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 14/541,294

(22) Filed: Nov. 14, 2014

(65) Prior Publication Data
US 2015/0146096 A1 May 28, 2015

(30) Foreign Application Priority Data

Nov. 27, 2013 (JP) .................. 2013-245280

(51) Int. Cl.
*H04N 7/01* (2006.01)
*H04N 5/14* (2006.01)

(52) U.S. Cl.
CPC ............. *H04N 5/144* (2013.01); *H04N 5/145* (2013.01); *H04N 7/0127* (2013.01); *H04N 7/0132* (2013.01)

(58) Field of Classification Search
CPC .......... H04N 5/144; H04N 5/145; H04N 5/21; H04N 7/0132; H04N 7/0127; G09G 2320/0261; G09G 2320/106; G09G 2320/0435
USPC ........................................................ 348/459
See application file for complete search history.

(56) References Cited

U.S. PATENT DOCUMENTS

| 8,421,917 | B2 | 4/2013 | Kobayashi | |
|---|---|---|---|---|
| 8,487,919 | B2 | 7/2013 | Kobayashi | |
| 8,531,601 | B2 | 9/2013 | Kobayashi | |
| 8,842,220 | B2 | 9/2014 | Kobayashi | |
| 2009/0273611 | A1* | 11/2009 | Itokawa | G09G 5/00 345/619 |
| 2011/0069227 | A1* | 3/2011 | Kawai | G09G 5/003 348/452 |

(Continued)

FOREIGN PATENT DOCUMENTS

| JP | 2009-042481 A | 2/2009 |
|---|---|---|
| JP | 2009-044460 A | 2/2009 |

(Continued)

*Primary Examiner* — Michael Lee
(74) *Attorney, Agent, or Firm* — Fitzpatrick, Cella, Harper & Scinto

(57) ABSTRACT

An image-processing device is configured to detect a motion region within an input image; generate an intermediate image from an N-th frame and an (N+1)-th frame; perform processing of reducing a high-frequency component of spatial frequency on the intermediate image; and output an image of which a frame rate is increased by insertion of the intermediate image having undergone the processing between the N-th frame and the (N+1)-th frame. When a target position at which a pixel value of the intermediate image is to be calculated lies within the motion region, a pixel value of the intermediate image at the target position is calculated using a pixel value of the N-th frame and a pixel value of the (N+1)-th frame at a position in the vicinity of the target position and outside the motion region.

20 Claims, 24 Drawing Sheets

(56) References Cited

U.S. PATENT DOCUMENTS

| | | | |
|---|---|---|---|
| 2011/0110602 A1* | 5/2011 | Hiraki | G09G 3/2022 382/260 |
| 2011/0211119 A1* | 9/2011 | Petrides | H04N 5/145 348/576 |
| 2011/0249135 A1 | 10/2011 | Minato | |

FOREIGN PATENT DOCUMENTS

| | | |
|---|---|---|
| JP | 4586052 B2 | 11/2010 |
| JP | 2013-059092 A | 3/2013 |

* cited by examiner

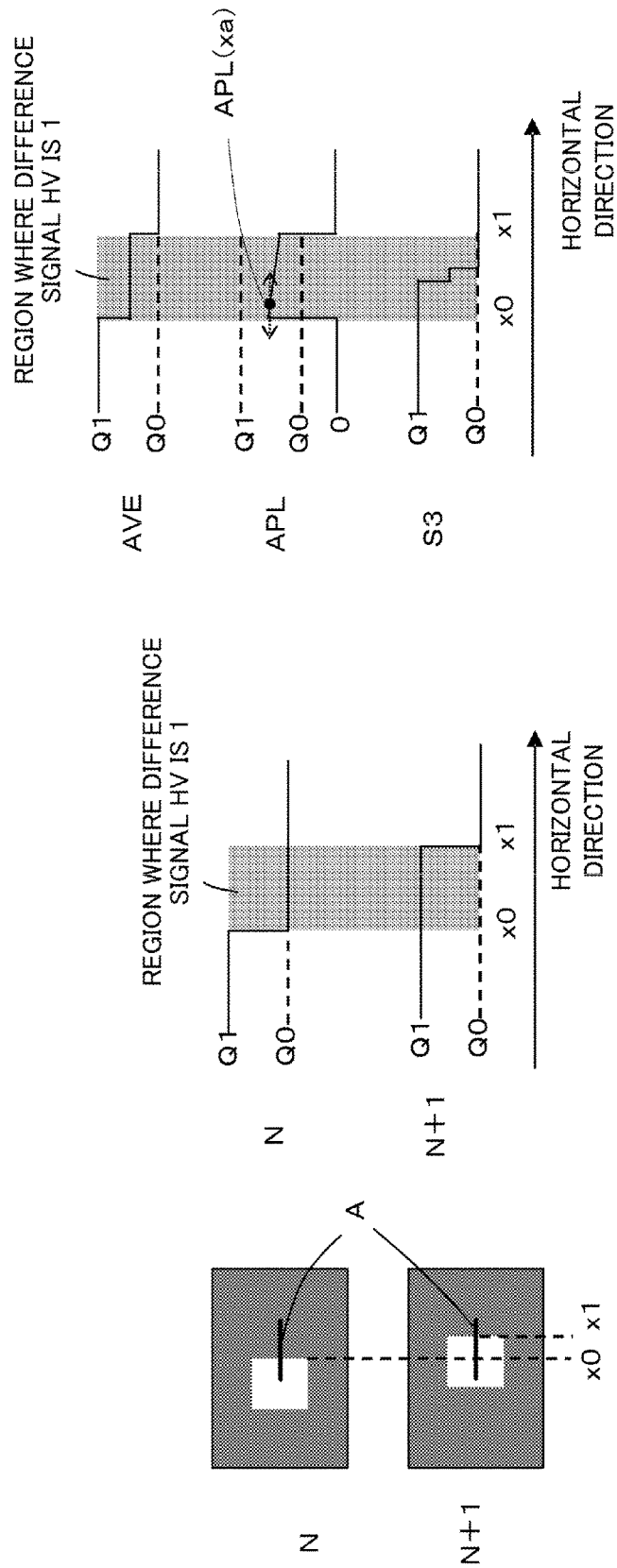

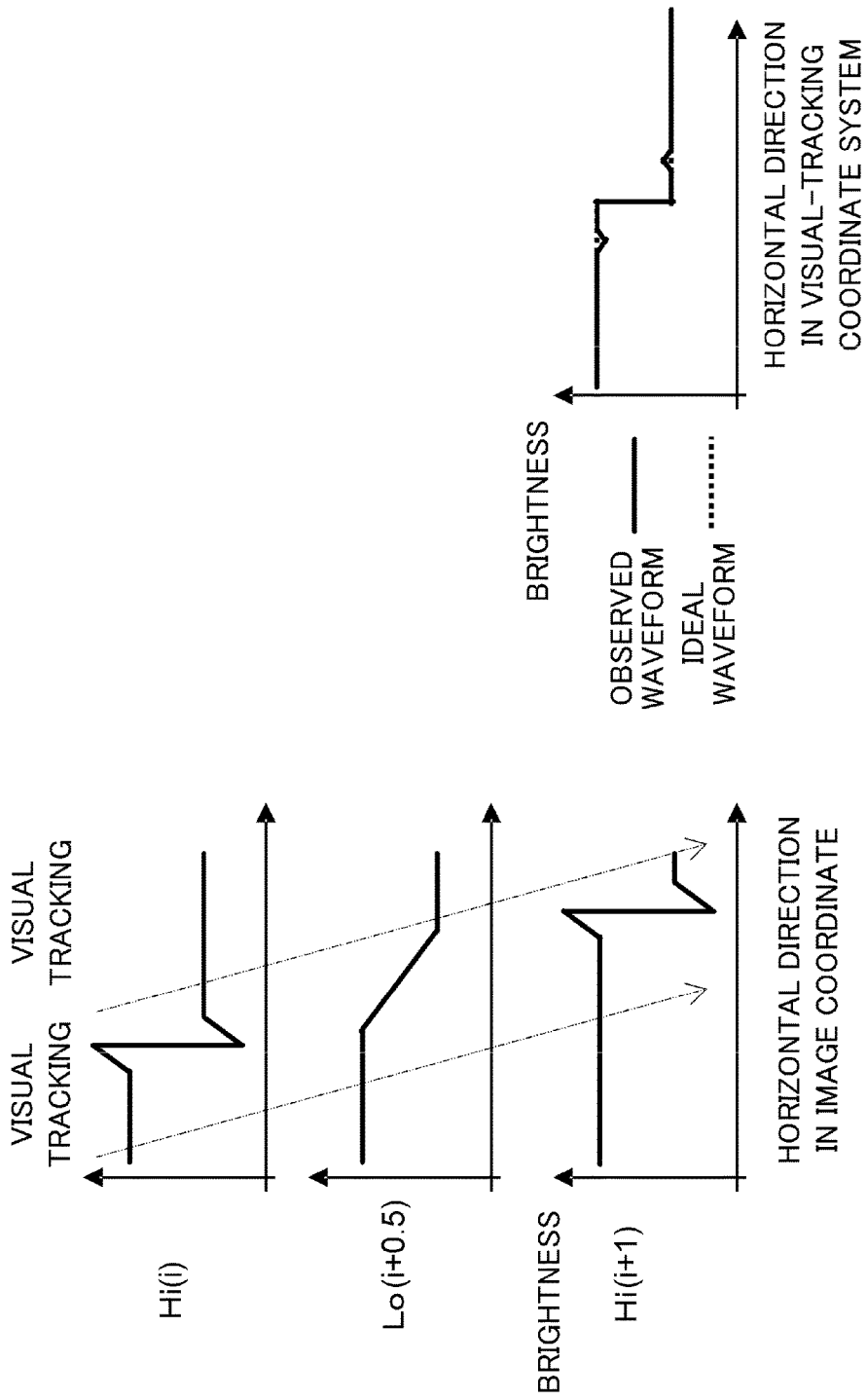

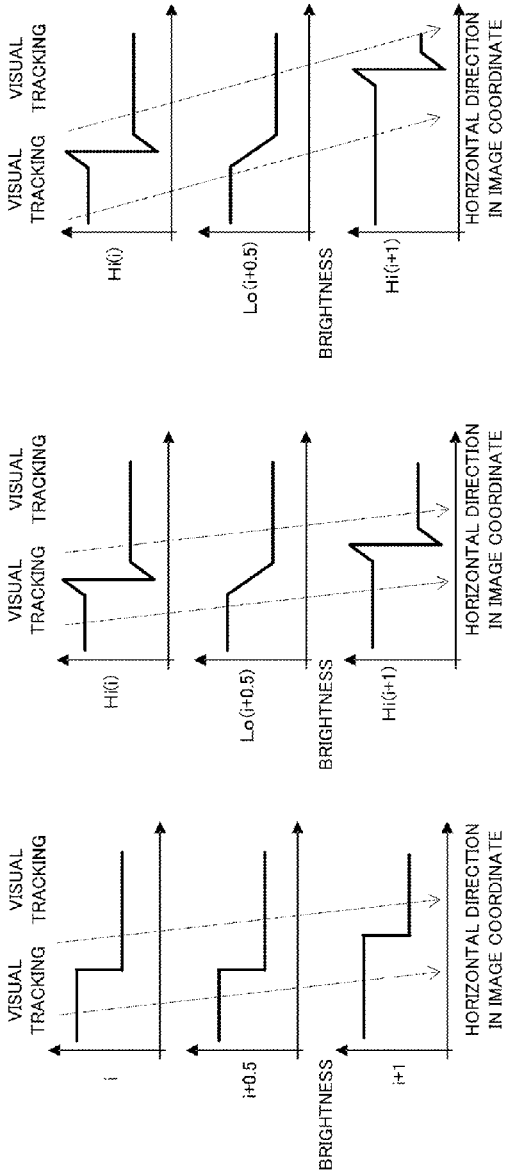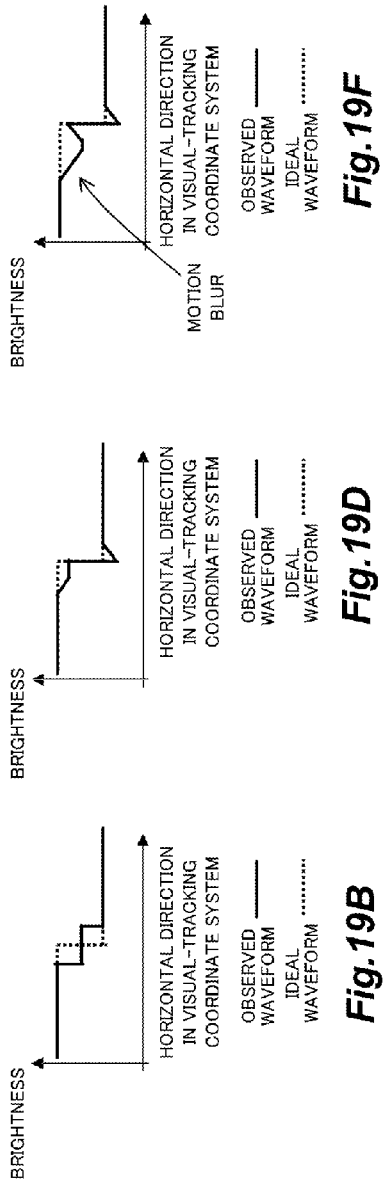

IMAGE-PROCESSING DEVICE AND CONTROL METHOD THEREOF

BACKGROUND OF THE INVENTION

Field of the Invention

The present invention relates to an image-processing device and a control method thereof.

Description of the Related Art

Conventional frame rate conversion methods in which a frame frequency is increased by a factor of N (N being a natural number equal to or greater than 2) include methods wherein a one-frame image is divided (distributed) into a plurality of sub-frames. Frame rate conversion methods include methods that involve dividing an input image into a sub-frame in which a high-frequency component is pre-emphasized (pre-emphasized sub-frame, hereafter referred to as "Hi image") and a sub-frame in which a high-frequency component is reduced or de-emphasized (de-emphasized sub-frame, hereafter referred to as "Lo image"), and alternately outputting then the sub-frames. Such a method is called a drive distribution method. This drive distribution method allows reducing the perception of motion blur that arises in visual tracking (feature of vision of a moving picture whereby a moving object within the image is tracked in the line of sight). Technologies relating to drive distribution methods are disclosed in, for instance, Japanese Patent Application Publication Nos. 2009-44460 and 2009-42481. An explanation follows next on an instance where a drive distribution method is implemented, and an instance where it is not, compared with each other.

FIG. 19A and FIG. 19B are diagrams illustrating an instance where an image identical to an inputted frame image is simply outputted in the form of two sub-frame images, through frame rate conversion in which no drive distribution method is implemented. FIG. 19A illustrates, as image data, the brightness of pixels on a given horizontal line within the image. The abscissa axis direction represents pixel position, in the horizontal direction, within the image, and the ordinate axis denotes the brightness value of each pixel. The square waveform represents the change in brightness at a given coordinate in the horizontal direction. An input frame is referred to as i frame, a subsequent input frame as i+1 frame, and an intermediate frame between the i frame and the i+1 frame is referred to as i+0.5 frame (i: natural number). Movement of the square waveform rightward in the horizontal direction indicates that motion towards the right in the horizontal direction is taking place in the image. FIG. 19B illustrates a waveform (image) that is perceived (observed) by an observer when visually tracking the image of FIG. 19A so as to match the motion of the image. The abscissa axis represents a horizontal direction coordinate in a coordinate system that conforms to the motion in visual tracking, and the ordinate axis represents brightness. The solid line represents the observed waveform, and the dashed line represents an ideal waveform, i.e. what is intended, in the image data, to be perceived by the observer. The same applies to FIG. 7 and FIG. 19A to FIG. 19F.

FIG. 19A illustrates the waveforms of three frames, namely i frame, i+0.5 frame, i+1 frame (referred to as i waveform, i+0.5 waveform and i+1 waveform), for the square waveform that is moving in the horizontal rightward direction. FIG. 19B is the waveform that is observed through visual tracking. The waveform actually perceived by human vision upon visual tracking is a combination of the i waveform and i+0.5 waveform in FIG. 19A, and constitutes a waveform such as the one denoted by the solid line in FIG. 19B. As can be seen from FIG. 19B, the waveform that is observed through visual tracking (solid line) has a brightness portion of intermediate gradation, with respect to the ideal square waveform (dashed line). This portion is observed in the form of moving image blur during visual tracking.

FIG. 19C and FIG. 19D are diagrams illustrating an instance where a Hi image and a Lo image are alternately outputted through frame rate conversion relying on a drive distribution method. FIG. 19C illustrates waveforms of a Hi image, a Lo image and a Hi image that are generated for the i frame, the i+0.5 frame and the i+1 frame, in accordance with a drive distribution method, for a square waveform that is moving in the horizontal rightward direction. The waveforms will be referred to hereafter as Hi (i) waveform, Lo (i+0.5) waveform and Hi (i+1) waveform, respectively. FIG. 19D illustrates a waveform (image) that is perceived (observed) by an observer when visually tracking the image of FIG. 19C so as to match the motion of the image.

The waveform actually perceived by human vision as a result of visual tracking is a combination of the Hi (i) waveform and the Lo (i+0.5) waveform in FIG. 19C, and constitutes a waveform such as the one denoted by the solid line in FIG. 19D. As can be seen from FIG. 19D, the portion at which brightness differs significantly from that of the ideal square waveform (dashed line), in the waveform observed through visual tracking (solid line), is small, and there are fewer pixels of intermediate gradation as compared with FIG. 19B. As a result, the image is observed with less moving image blur.

SUMMARY OF THE INVENTION

In the drive distribution method the input image is subjected to a filtering process, to be separated into a component of low spatial frequency and a component of high spatial frequency. The component of low spatial frequency is outputted divided into two sub-frames, and the component of high spatial frequency is outputted concentrated in one sub-frame. In the case of frame rate conversion of an image that includes a fast-moving object, substantial positional shift occurs in this method, between sub-frames, at the boundary portion (edge portion) of the object and the background. Accordingly, motion blur may fail to be sufficiently reduced when tracked. An example of a process of a fast-moving image in accordance with a drive distribution method will be explained with reference to FIG. 19E and FIG. 19F.

FIG. 19E and FIG. 19F are diagrams illustrating an instance where a Hi image and a Lo image are alternately outputted, through frame rate conversion, in accordance with a drive distribution method, of a square waveform moving fast in the horizontal rightward direction. FIG. 19E illustrates three frames, Hi (i), Lo (i+0.5) and Hi (i+1), generated in accordance with a conventional drive distribution method. FIG. 19F illustrates a waveform (image) that is perceived (observed) by an observer when visually tracking the image of FIG. 19E so as to match the motion of the image. The waveform observed through visual tracking exhibit pixels with a large fall-off in brightness, as denoted by the solid line in FIG. 19F, with respect to the ideal square waveform (dashed line). That portion is observed as moving image blur.

The present invention suppresses observation of motion blur in a case where an observer visually tracks an image having been subjected to frame rate conversion in accordance with a drive distribution method.

A first aspect of the present invention is an image-processing device including:

a detection unit configured to detect a motion region of motion in an image between an N-th frame image and an (N+1)-th frame image of an input image;

a generation unit configured to generate an intermediate image from the N-th frame image and the (N+1)-th frame image, on the basis of a detection result by the detection unit;

a processing unit configured to perform on the intermediate image processing of reducing a high-frequency component of spatial frequency; and an output unit configured to output an image resulting from increasing a frame rate of the input image through insertion of the intermediate image having undergone the image processing, between the N-th frame image and the (N+1)-th frame image, wherein when a target position at which a pixel value of the intermediate image is to be calculated lies within the motion region, the generation unit calculates a pixel value of the intermediate image at the target position using a pixel value of the N-th frame image and a pixel value of the (N+1)-th frame image at a position in the vicinity of the target position and outside the motion region.

A second aspect of the present invention is a control method of an image-processing device, the method including:

detecting a motion region of motion in an image between an N-th frame image and an (N+1)-th frame image of an input image;

generating an intermediate image from the N-th frame image and the (N+1)-th frame image, on the basis of a detection result in the detecting process;

performing on the intermediate image processing of reducing a high-frequency component of spatial frequency; and outputting an image resulting from increasing a frame rate of the input image through insertion of the intermediate image having undergone the image processing, between the N-th frame image and the (N+1)-th frame image, wherein when in the generating process a target position at which a pixel value of the intermediate image is to be calculated lies within the motion region, a pixel value of the intermediate image at the target position is calculated using a pixel value of the N-th frame image and a pixel value of the (N+1)-th frame image at a position in the vicinity of the target position and outside the motion region.

The present invention succeeds in suppressing observation of motion blur in a case where an observer visually tracks an image having been subjected to frame rate conversion in accordance with a drive distribution method.

Further features of the present invention will become apparent from the following description of exemplary embodiments (with reference to the attached drawings).

BRIEF DESCRIPTION OF THE DRAWINGS

FIG. 16A to FIG. 16C are diagrams for explaining the operation of the first image-generating unit 300 of Embodiment 5;
FIG. 17A and FIG. 17B are diagrams illustrating, as waveforms, an output image and the appearance thereof, in Embodiment 5;
FIG. 19A to FIG. 19F are diagrams illustrating instances of visual tracking in conventional art.

DESCRIPTION OF THE EMBODIMENTS (Embodiment 1)

Figure 1:
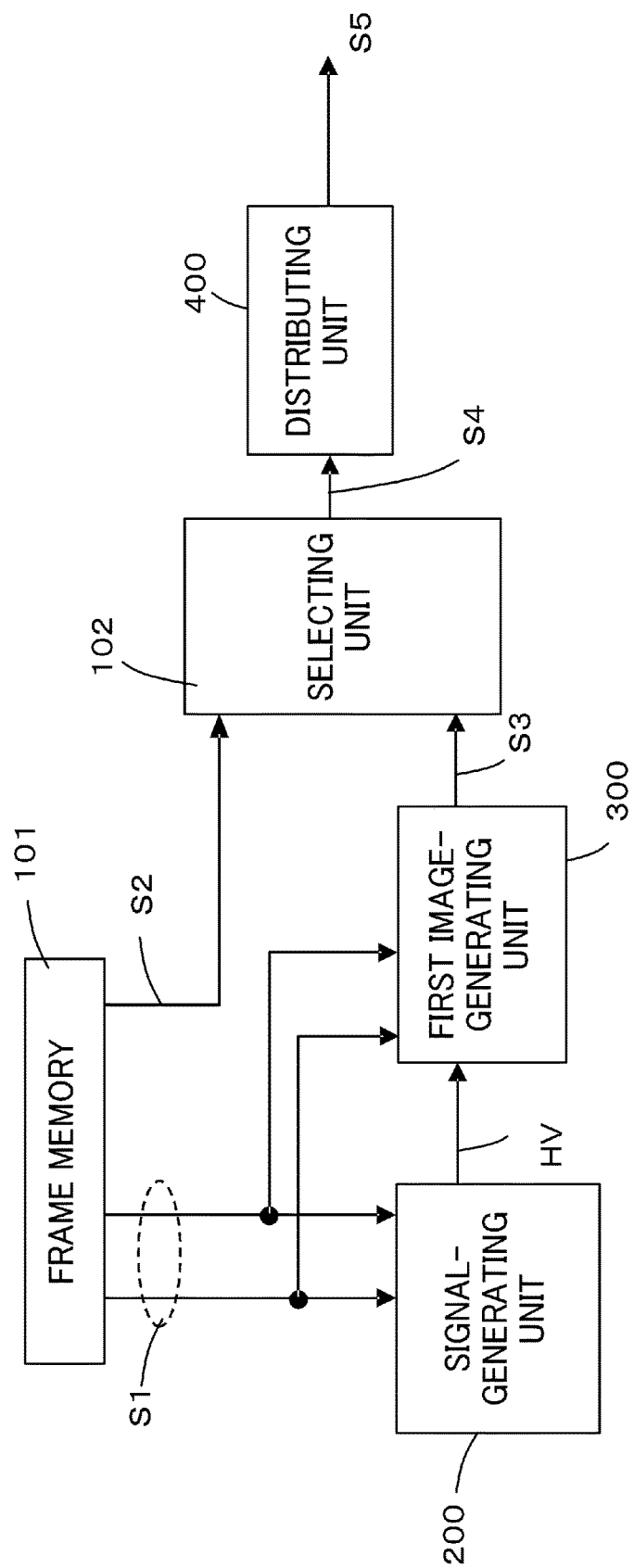
FIG. 1 is a block diagram of Embodiment 1.

A first embodiment of the image-processing device and control method thereof according to the present invention will be explained next. The image-processing device in Embodiment 1 increases a frame rate by dividing one frame period of an input image into two sub-frame periods, and alternately outputting, at each sub-frame period, a pre-emphasized sub-frame (Hi image) and a de-emphasized sub-frame (Lo image) generated from the input image. Embodiment 1 is an example in which the present invention is used in an image-processing device in which frame rate conversion is performed in accordance with such a drive distribution method. FIG. 1 is a block diagram illustrating the schematic configuration of the image-processing device of Embodiment 1. The image-processing device of Embodiment 1 illustrated in FIG. 1 has a frame memory 101, a signal-generating unit 200, an first image-generating unit 300, a selecting unit 102 and a distributing unit 400. The operation of the image-processing device thus configured will be explained further on. In Embodiment 1, an instance will be explained wherein an input image having a frame rate of 60 Hz undergoes frame rate conversion to 120 Hz.

Figure 2:
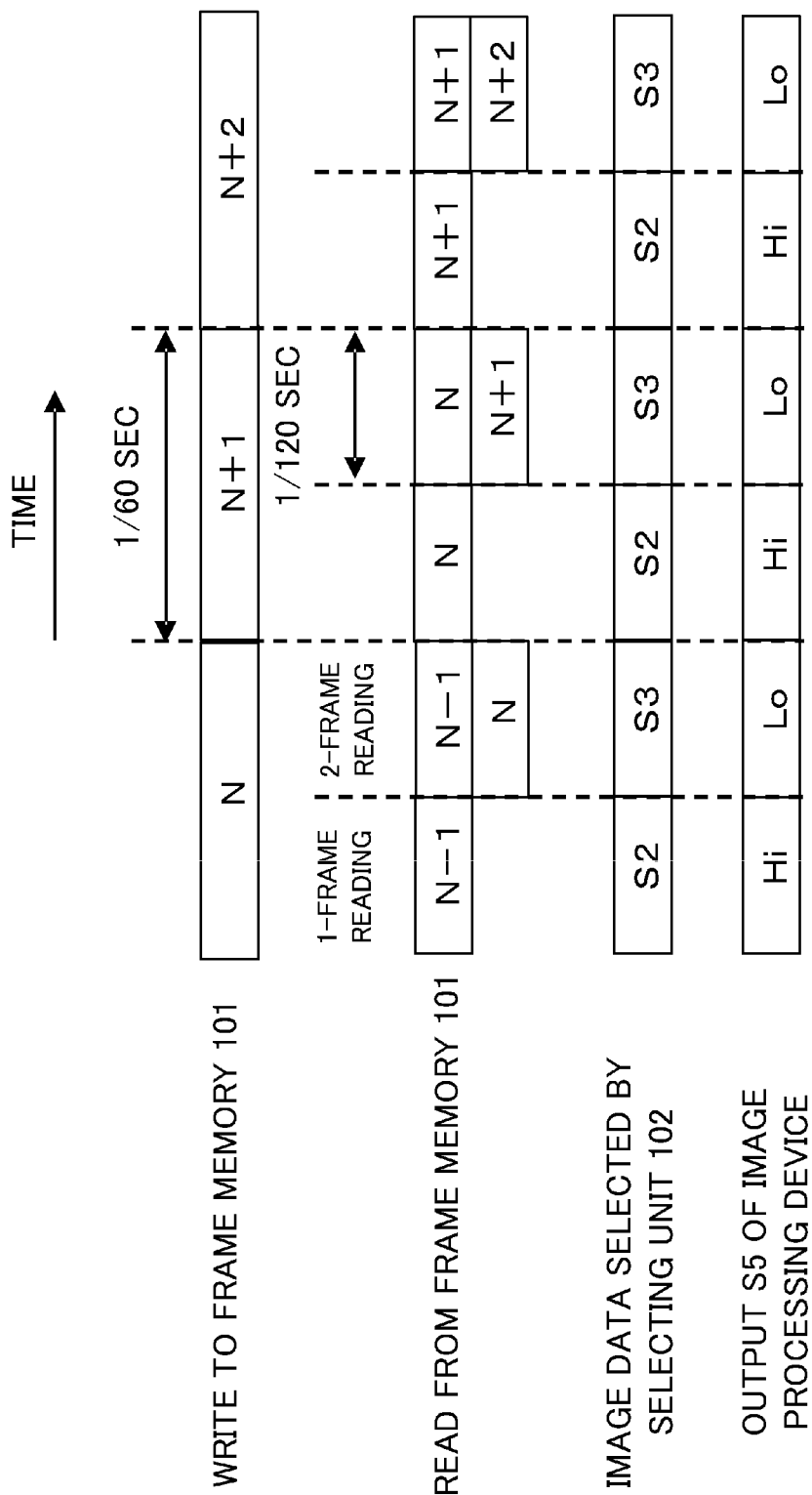
FIG. 2 is a timing chart of Embodiment 1.

FIG. 2 is a timing chart illustrating the operation of Embodiment 1. In the figure, N, N+1 and N+2 denote the frame numbers of the input image, such that a larger number translates into a later frame in time. Image writing and reading timings in the frame memory 101 will be explained with reference to FIG. 2. The input image is written on the frame memory 101 at a frame rate of 60 Hz. The image is read from the frame memory 101 at a frame rate of 120 Hz, as illustrated in FIG. 2. As illustrated in the figure, image reading from the frame memory 101 is performed through two-frame simultaneous reading alternated with one-frame reading. That is because two frames are necessary to create the Lo image, and one frame is necessary to create the Hi image.

The image data S1, S2 illustrated in FIG. 1 denote image data that is read alternately from the frame memory 101. The image data S1 is read to create the Lo image and the image data S2 is read to create the Hi image.

<Operation to Output the Lo Image>

The operation at the time of creation of the Lo image will be explained first. An example will be explained of a timing such that the two-frame image data S1 read from the frame memory 101 is an N frame and an N+1 frame.

The signal-generating unit 200 receives the image data S1 and outputs a difference signal HV. The signal-generating unit 200 detects the direction of motion of a pixel having a small difference of the N frame and the N+1 frame (previous-next frame difference), and of a pixel having a large difference. The difference signal HV is a signal of three values, as follows.

$$HV = 0\text{(pixel having a previous-next frame difference} \quad \text{(Expression 1)}$$
$$\text{equal to or smaller than a predefined value)}$$
$$= 1\text{(previous-next frame difference larger than}$$
$$\text{predefined value, horizontal motion pixel)}$$
$$= 2\text{(previous-next frame difference larger than}$$
$$\text{predefined value, vertical motion pixel)}$$

In Embodiment 1 there are detected two types of motion direction, horizontal and vertical, but the motion directions that are detected are not limited thereto, and some other direction, or more directions, may alternatively be detected.

Figure 3A:
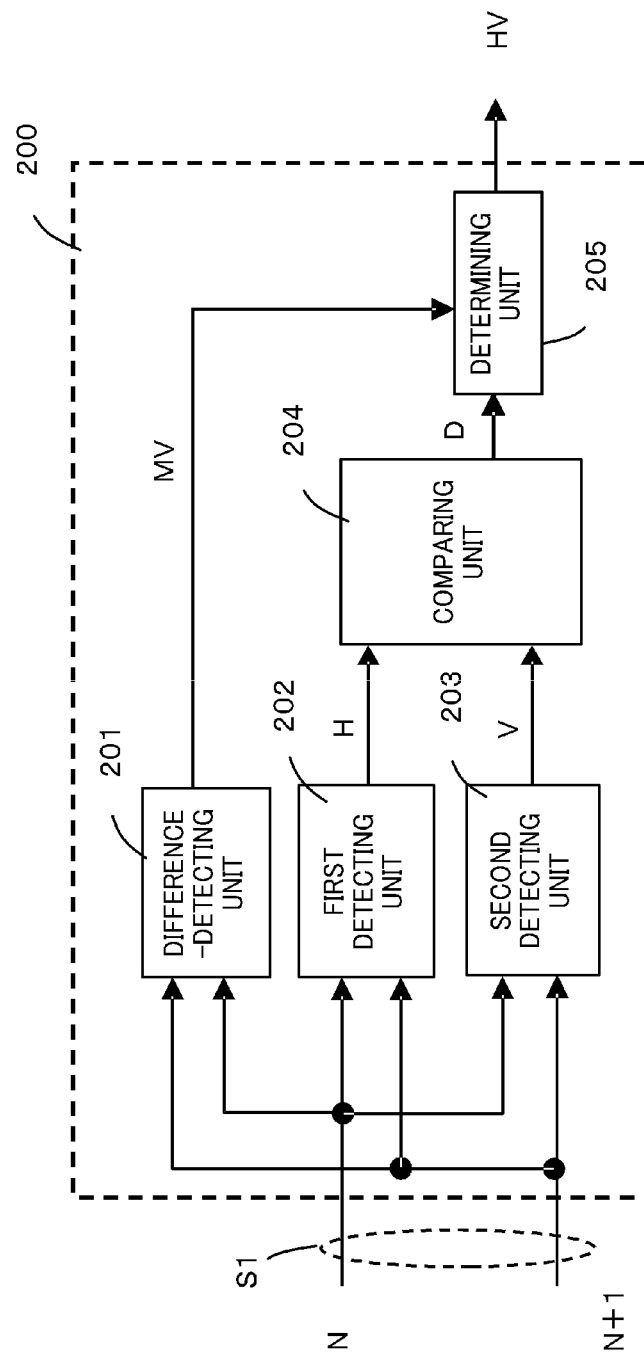
FIG. 3A and FIG. 3B are block diagrams of a signal-generating unit 200 and an first image-generating unit 300 of Embodiment 1.

The details of the signal-generating unit 200 will be explained with reference to FIG. 3A. FIG. 3A is a block diagram of the signal-generating unit 200. The signal-generating unit 200 has a difference-detecting unit 201, a first detecting unit 202, a second detecting unit 203, a comparing unit 204 and a determining unit 205. The image data of the N frame and the N+1 frame are inputted to the difference-detecting unit 201, the first detecting unit 202 and the second detecting unit 203.

The difference-detecting unit 201 calculates a difference absolute value of pixel value of a pixel of identical coordinates in the N frame and the N+1 frame. The difference-detecting unit 201 compares the calculated difference absolute value with a predefined value set beforehand, and outputs 1, as a motion signal MV, if the difference absolute value is larger than a predefined value, and 0 if the difference absolute value is equal to or smaller than a predefined value.

The first detecting unit 202, the second detecting unit 203 and the comparing unit 204 detect whether the pixel of interest is of horizontal motion or of vertical motion.

The first detecting unit 202 calculates a difference absolute value between a pixel value N(x, y) of the pixel of interest in the N frame and a pixel value of each pixel within a predefined range, in the horizontal direction, centered on the pixel of interest, in the N+1 frame. The predefined range is set to [x−c, x+c] (c is a constant), where x is the coordinate of the pixel of interest. The first detecting unit 202 calculates respective difference absolute values between the pixel value N(x, y) in the N frame and pixel values N+1 (x−c, y), N+1 (x−c+1, y), . . . , N+1 (x+c−1, y), N+1(x+c, y) in the N+1 frame. The first detecting unit 202 outputs a minimum value H from among the plurality of difference absolute values that are calculated. In a case where there is a pixel of horizontal motion, the pixel value of the pixel of interest in the N frame and the pixel value of any one pixel within the horizontal predefined range in the N+1 frame exhibit ordinarily close values, and the minimum value H takes on accordingly a small value.

The second detecting unit 203 performs the same process as the first detecting unit 202, but in the vertical direction, and outputs a minimum value V.

The comparing unit 204 outputs 0 as a direction signal D, if the minimum value H is equal to or smaller than the minimum value V, and outputs 1 if the minimum value H is larger than the minimum value V. In the case of a pixel with motion in an oblique direction, there is detected the horizontal direction or vertical direction having the higher correlation with the direction of oblique motion.

The determining unit 205 generates a difference signal HV on the basis of the motion signal MV and the direction signal D, in accordance with Expression 2 below.

$$HV = 0\text{(case where motion signal } MV = 0) \quad \text{(Expression 2)}$$
$$= 1\text{(case where motion signal } MV = 1 \text{ and direction}$$
$$\text{signal } D = 0)$$
$$= 2\text{(case where motion signal } MV = 1 \text{ and direction}$$
$$\text{signal } D = 1)$$

In Embodiment 1, the motion direction is detected on the basis of horizontal difference detection and vertical difference detection, as described above, but motion direction detection is not limited to that method, and for instance some other motion detection scheme by block matching may be resorted to. In Embodiment 1, thus, there is detected firstly motion within the image on the basis of an N-th frame image and an (N+1)-th frame image of the input image.

The first image-generating unit 300 receives the difference signal HV outputted by the signal-generating unit 200, and outputs intermediate image data S3. If a target pixel for which the pixel value in the intermediate image data S3 is calculated is not a pixel within a motion region, i.e. if the difference signal HV is 0 (pixel of small previous-next frame difference), the average value of pixel values of the target pixel in the previous and next frames are set as the pixel value of the target pixel. If the target pixel is a pixel within the motion region, i.e. if the difference signal HV is other than 0 (pixel of large previous-next frame difference), then a pixel value obtained as a result of the below-described search is used as the pixel value of the target pixel.

Figure 3B:
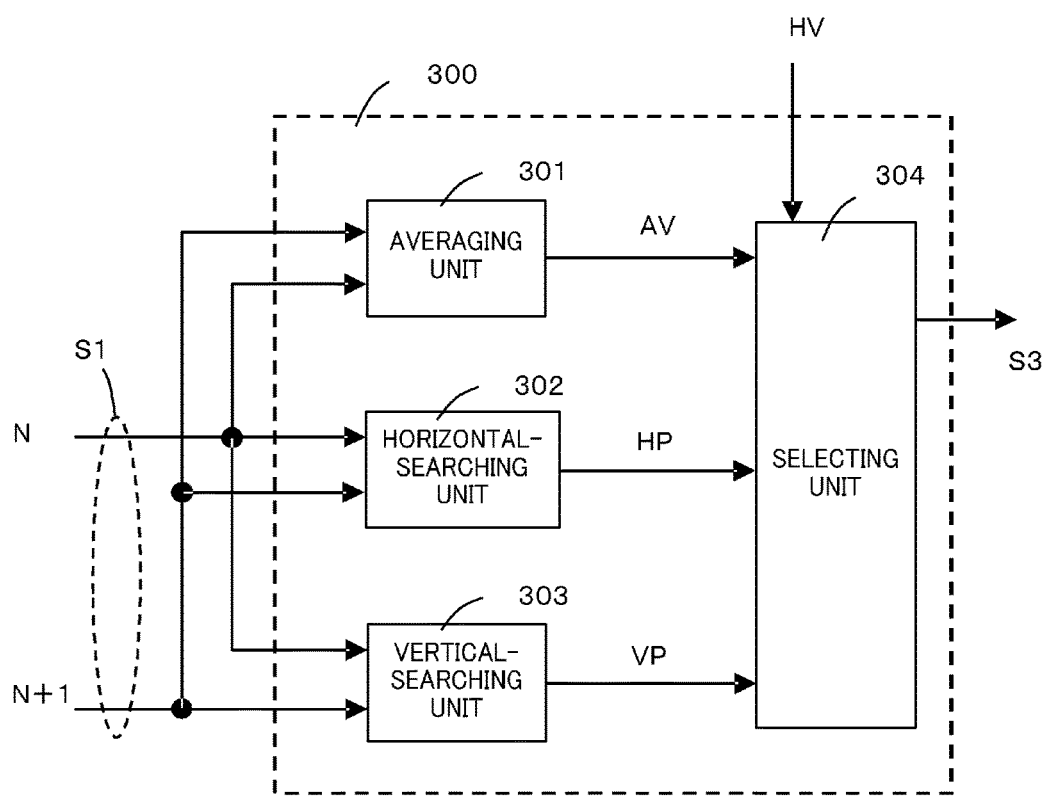

The details of the first image-generating unit 300 will be explained next with reference to FIG. 3B. FIG. 3B is a block diagram of the first image-generating unit 300. The first image-generating unit 300 has an averaging unit 301, a horizontal-searching unit 302, a vertical-searching unit 303 and a selecting unit 304.

The averaging unit 301 calculates an average value AV of the pixel values of a pixel of identical coordinates in the N frame and the N+1 frame. The averaging unit 301 outputs the calculated average value AV to the selecting unit 304.

Figure 4:
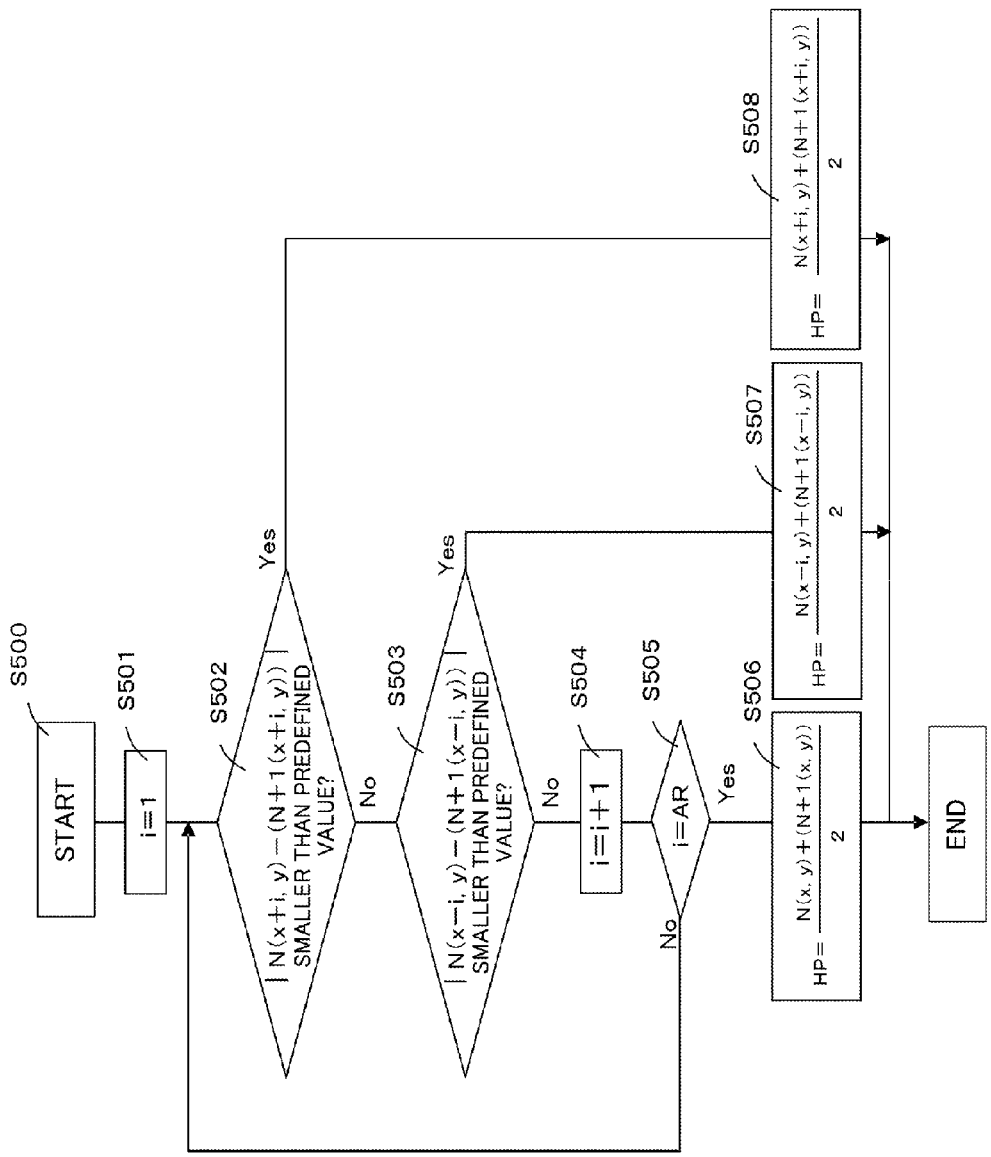
FIG. 4 is a flowchart for explaining the operation of the first image-generating unit 300 of Embodiment 1.

The horizontal-searching unit 302 sequentially calculates, in order from a pixel that is positioned close to the coordinate of the target pixel, a respective difference absolute value (previous-next frame difference absolute value) of the pixel value of the above pixel in the N frame, and the pixel value in the N+1 frame, to search a pixel of small previous-next frame difference absolute value. The horizontal-searching unit 302 calculates, and outputs, a pixel value HP of the target pixel, on the basis of the pixel value of the found pixel. FIG. 4 is a process flow diagram of the horizontal-searching unit 302. In the figures, (x, y) denotes the coordinate value of the target pixel, i denotes a counter for shifting the coordinate value during the search, and AR denotes a predefined value that delimits the search range.

In step S501, the horizontal-searching unit 302 initializes the counter i to 1.

Steps S502 to 505 constitute a loop. In this loop, the horizontal-searching unit 302 sequentially calculates, in order from a pixel that is positioned close to the coordinate (x, y) of the target pixel, a respective difference absolute value of the pixel value of the above pixel in the N frame, and the pixel value in the N+1 frame, to search a pixel having a small difference absolute value.

In step S502, the horizontal-searching unit 302 determines whether the previous-next frame difference absolute value of a search coordinate (x+i, y) is smaller than a predefined value. If the previous-next frame difference absolute value is smaller than a predefined value (S502: Yes), the process proceeds to step S508; if the previous-next frame difference is equal to or greater than the predefined value (S502: No), the process proceeds to step S503.

In step S503, the horizontal-searching unit 302 determines whether the previous-next frame difference of a search coordinate (x−i, y) is smaller than a predefined value. If the previous-next frame difference is smaller than a predefined value (S503: Yes), the process proceeds to step S507; if the previous-next frame difference is equal to or greater than the predefined value (S503: No), the process proceeds to step S504.

In step S504, the horizontal-searching unit 302 increments the counter i, and determines in step S505 whether the search of the predefined range is completed or not. If the search of the predefined range is not completed (S505: No), the process returns to step S502; if the search of the predefined range is completed (S505: Yes), the process proceeds to step S506.

In steps S506, 507 and 508, the horizontal-searching unit 302 calculates the pixel value HP of the target pixel in each case.

In step S506, the horizontal-searching unit 302 sets the average value of the pixel values of the previous and next frames of the target pixel as the pixel value HP of the target pixel.

In steps S507 and 508, the horizontal-searching unit 302 sets, as the pixel value HP of the target pixel, the average value of the pixel values of the pixel in the previous and next frames at a position that is closest, in the horizontal direction, to the target pixel, from among the pixels the previous-next frame differences whereof are smaller than the predefined value. The horizontal-searching unit 302 outputs the calculated pixel value HP of the target pixel to the selecting unit 304.

In the above process there is calculated a pixel having a magnitude of an inter-frame difference, between the pixel value in the N-th frame image and the pixel value at the (N+1)-th frame image, that is smaller than a predefined value, from among the pixels within a predefined range centered on the target pixel. The average value of the pixel values in the N-th frame image and the pixel value at the (N+1)-th frame image, of the obtained pixel, is set as the pixel value of the target pixel. In the above flow there is calculated a pixel at a position that is closest to the target pixel, from among the pixels that have a magnitude of inter-frame difference, within a predefined range, smaller than the predefined value. The average value of the pixel values in the N-th frame image and the pixel value at the (N+1)-th frame image, of the obtained pixel, is then set as the pixel value of the target pixel. When there is no pixel having a magnitude of inter-frame difference, within the predefined range, that is smaller than the predefined value, then the pixel value of the target pixel is set to the average value of the pixel value of the target pixel in the N-th frame image and the pixel value at the (N+1)-th frame image. In the above flow, the predefined range comprises a range set in the motion direction of a moving object, from the target pixel (horizontal direction rightward orientation), and a range set in an opposite direction (horizontal direction leftward orientation) of the motion direction, from the target pixel.

The vertical-searching unit 303 performs the same process as the horizontal-searching unit 302, but in the vertical direction.

The selecting unit 304 selects any one of the average value AV, the pixel value HP and the pixel value VP, in accordance with the difference signal HV outputted by the signal-generating unit 200, and outputs the selection as the intermediate image data S3. The selecting unit 304 selects the average value AV, the pixel value HP or the pixel value VP on the basis of Expression 3 below.

$$S3 = AV(\text{difference signal } HV = 0(\text{case where previous-next difference is small}))$$
$$= HP(\text{case where difference signal } HV = 1(\text{horizontal motion}))$$
$$= VP(\text{case where difference signal } HV = 2(\text{vertical motion}))$$

(Expression 3)

Figure 5:
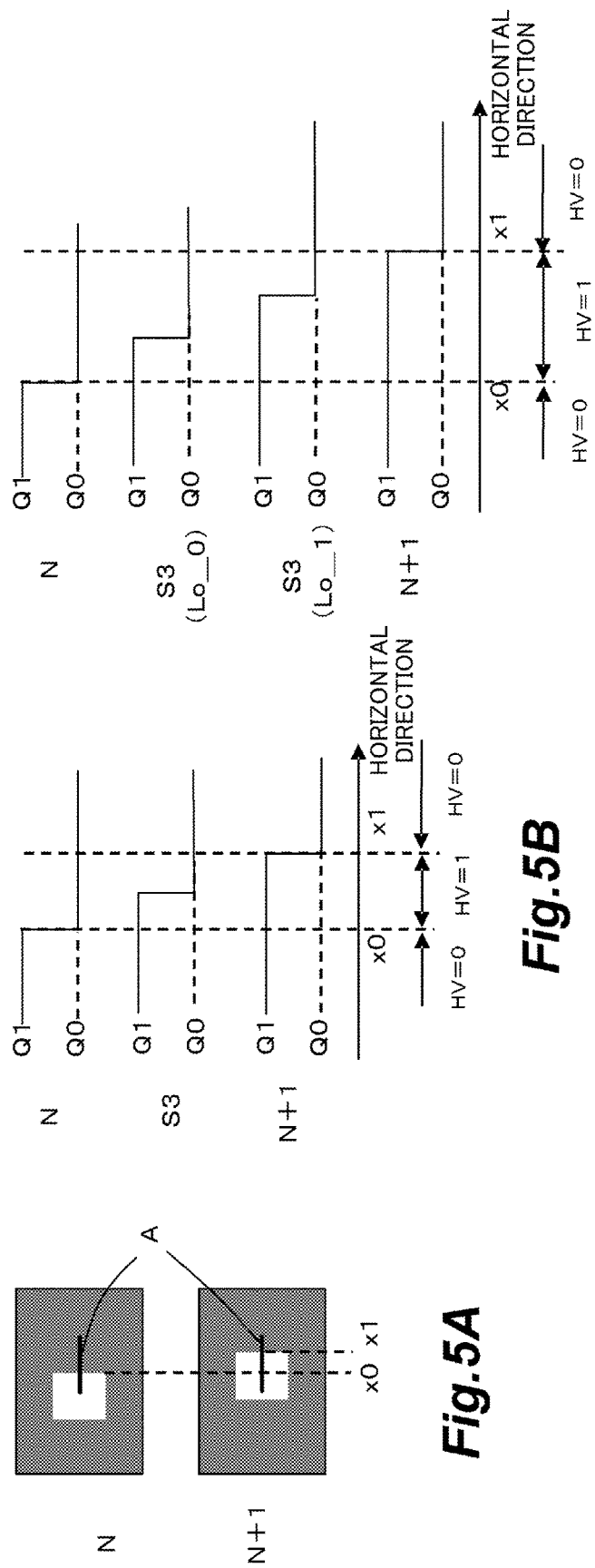
FIG. 5A to FIG. 5C are diagrams for explaining the operation of the first image-generating unit 300 of Embodiments 1 and 2.

FIG. 5A and FIG. 5B are diagrams for explaining the operation of the first image-generating unit 300. FIG. 5A illustrates an image at an N frame and an N+1 frame. In the N frame and N+1 frame, a white-square object moves from the left to the right against a black background, as illustrated in the figure. Herein, Q0 is set as the pixel value of the black background and Q1 as the pixel value of the object. FIG. 5B is a diagram illustrating the pixel values of pixels of one line denoted by line A in FIG. 5A.

Each pixel in the motion region (x0≤x≤x1) flanked by the coordinates x0, x1 in FIG. 5B yields a difference signal HV=1, and yields a difference signal HV=0 at a region (x<x0, x1<x) other than the motion region. As illustrated in FIG. 5B, the motion region is a region between a position at the boundary between a moving object and the background, in the N-th frame image, and the position of the boundary of the moving object and the background in the (N+1)-th frame image.

The first image-generating unit 300 sets, as the pixel value of the pixels of difference signal HV=0, the average value of the pixel value of the pixel in the N frame and the pixel value in the N+1 frame. Accordingly, the pixel value of the pixels of the x<x0 region is Q1, and the pixel value of the pixels of the x>x1 region is Q0, as denoted by the intermediate image data S3 of FIG. 5B.

The pixels of difference signal HV=1 take on the pixel value created by the horizontal-searching unit 302, such that the pixel value of the pixels in the region closer to x0 than the center of the x0≤x≤x1 region is Q1, and the pixel value of the pixels in the region closer to x1 than the center is Q0, as illustrated in FIG. 5B. As a result, the boundary between a moving object and the background becomes positioned within the motion region, as illustrated in the graph of the intermediate image data S3 of FIG. 5B.

The positional shift of the boundary portion (edge portion) of the object and the background, between sub-frames, is thus reduced through insertion of the generated intermediate image data S3 between the N frame and the N+1 frame; as a result, it becomes possible to suppress perception of motion blur during visual tracking.

The selecting unit 102 of FIG. 1 alternately switches, at 120 Hz, between the image data S2 read from the frame memory 101 and the image data S3 outputted by the first image-generating unit 300, and outputs the data as the image data S4. Upon output the Lo image, the selecting unit 102 outputs the image data S3 as the image data S4, and upon output of the Hi image, the selecting unit 102 outputs the image data S2 as the image data S4.

Figure 6:
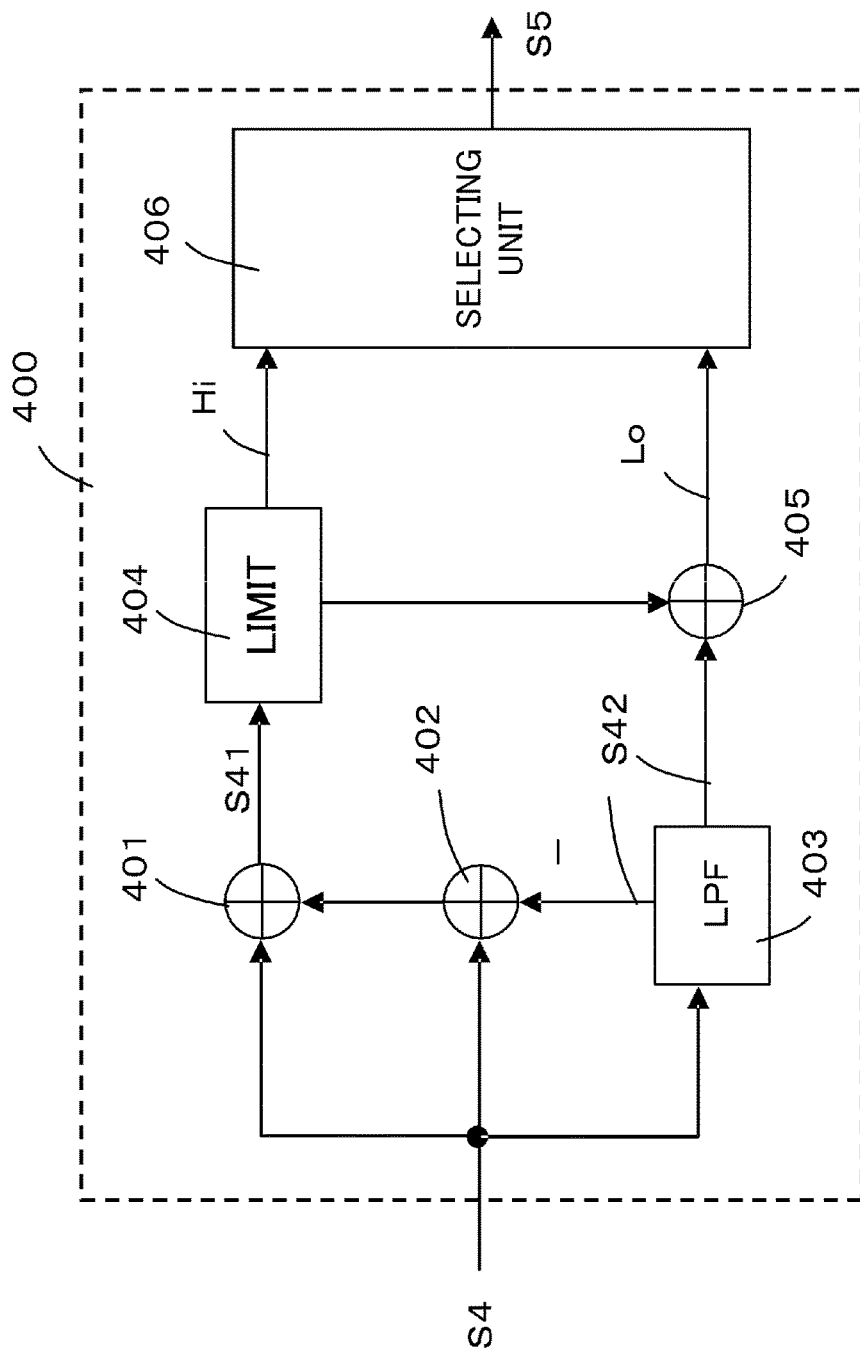
FIG. 6 is a block diagram of a distributing unit 400 of Embodiment 1.

The distributing unit 400 alternately outputs the Hi image and the Lo image at 120 Hz. FIG. 6 is a block diagram of the distributing unit 400. The distributing unit 400 has an adder 401, an adder 402, a low-pass filter (LPF) 403, a limit unit 404, an adder 405 and a selecting unit 406.

The image data S4 is inputted to the adder 401, the adder 402 and the LPF 403. The LPF 403 performs smoothing by applying a spatial LPF to the image data S4, and outputs the data as the image data S42. The LPF in Embodiment 1 has five horizontal and five vertical taps, but the number of taps is not limited thereto. The smoothed image data S42 is outputted to the adder 402 and the adder 405.

The adder 402 calculates the difference between the image data S42 and the image data S4 before smoothing, and extracts a high-frequency component that is outputted to the adder 401. The adder 401 adds the image data S4 and the extracted high-frequency component, and outputs the result as pre-emphasized image data S41.

The limit unit 404 and the adder 405 perform saturation processing. An overview of the limit unit 404 and the adder 405 will be explained next. A known technique can be resorted to herein for saturation processing (Japanese Patent Application Publication No. 2009-44460). The pre-emphasized image S41 is corrected, in the limit unit 404, in such a manner that pixel values that deviate from a tolerance are kept within the tolerance. The tolerance is for instance a range from 0 to 255 if image data is 8-bit data. The limit unit 404 outputs the corrected Hi image to the selecting unit 406, and outputs, to the adder 405, the pixel value fraction departing from the tolerance. The adder 405 adds the pixel value fraction departing from the tolerance to the image data S42. The adder 405 outputs the result of the addition, as the Lo image, to the selecting unit 406.

In the distributing unit 400 there is performed image processing of de-emphasizing the high-frequency component of spatial frequency, and image processing of pre-emphasizing the high-frequency component of spatial frequency, for the intermediate image, the N-th frame image and the (N+1)-th frame image.

Upon display of the Lo image, the selecting unit 406 selects the output from the adder 405. Upon display of the Hi image, the selecting unit 406 selects the output from the limit unit 404, and outputs the selection as image data S5. The image data S5 is displayed on a display panel, not depicted in the figures.

<Operation to Output a Hi Image>

The operation to output the Hi image will be explained next. An example will be explained of a timing such that the image data S2 read from the frame memory 101 is an N+1 frame. Upon output of the Hi image in FIG. 2, the selecting unit 102 selects the image data S2, and outputs this image data, as the image data S4, to the distributing unit 400. The distributing unit 400 performs the above-described process, creates the Hi image and the Lo image, and the selecting unit 406 outputs the Hi image as the image data S5.

The image-processing device of Embodiment 1 outputs an image having the frame rate of the input image increased through insertion of an intermediate image between the N-th frame image and the (N+1)-th frame image. Specifically, a one-frame display period is divided into the first sub-frame period of display of the Hi image, and the second sub-frame period of display of the Lo image. In the first sub-frame period, image data for one frame is read from the frame memory, the image data is converted to the Hi image having been pre-emphasized in the distributing unit 400, and is then outputted. In the second sub-frame period that follows the first sub-frame period, the image data for two consecutive frames is read from the frame memory, an intermediate image is generated, the image is converted to the Lo image having been de-emphasized in the distributing unit 400, and is then outputted. The image-processing device of Embodiment 1 generates thus, out of images of two temporally consecutive frames, a Lo image of an instance where the frame rate is increased through display of the Hi image and the Lo image in one-frame periods. As a result, a Lo image is generated in accordance with motion, if any, that is present in the image.

Figure 7:
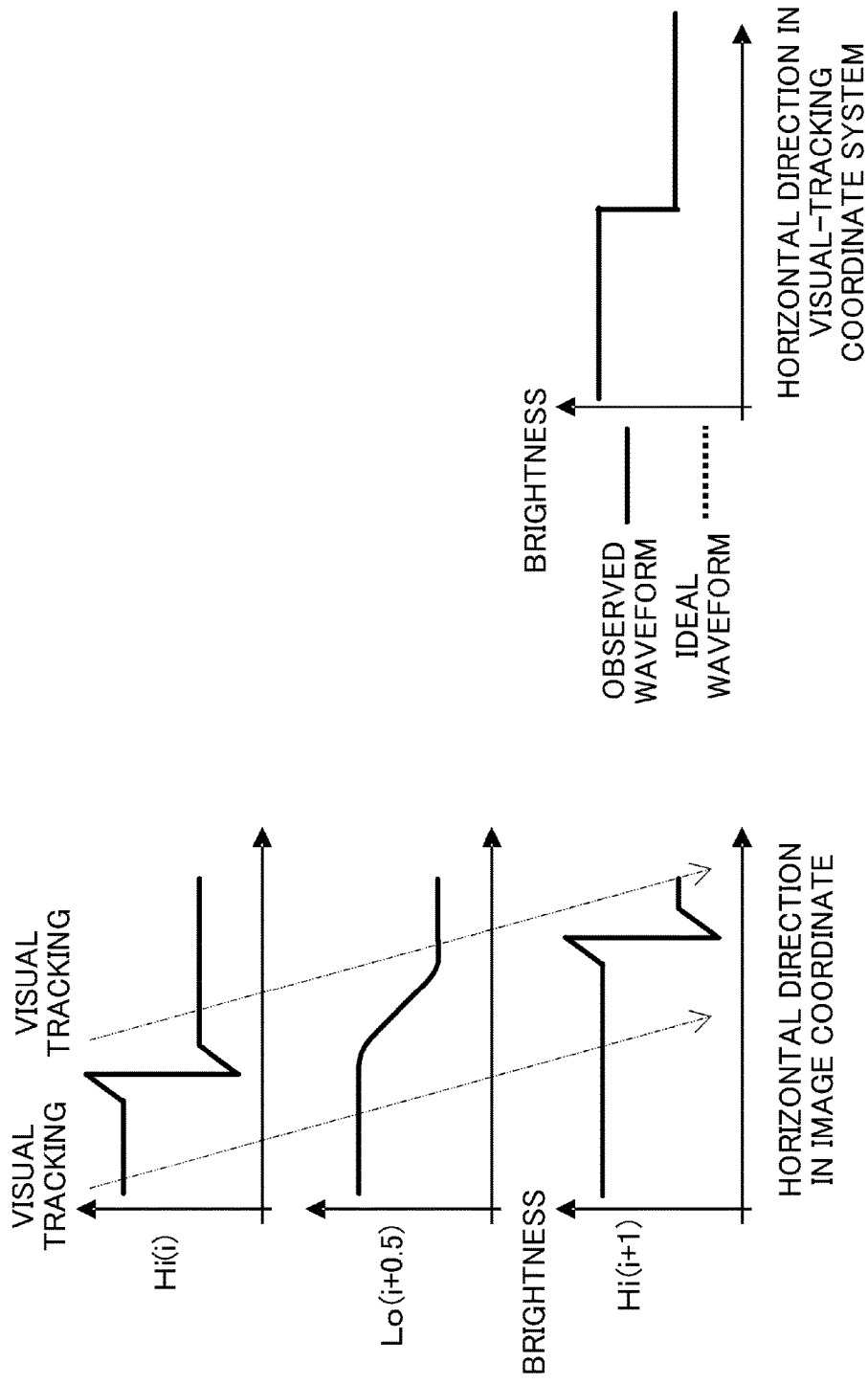
FIG. 7A and FIG. 7B are diagrams illustrating, as waveforms, an output image and the appearance thereof, in Embodiment 1.

FIG. 7 is a set of diagrams illustrating an output image in a case of alternating output of the Hi image and the Lo image in Embodiment 1, and illustrating the appearance of the output image as a waveform. FIG. 7A illustrates three frames Hi (i), Lo (i+0.5) and Hi (i+1) generated as a result of the process in Embodiment 1. Visual tracking of such waveforms yields a waveform that is close to an ideal square waveform, as illustrated in FIG. 7B. As a result, the image is observed with less moving image blur.

The image-processing device of Embodiment 1 generates the intermediate image data S3 on the basis of the difference signal HV that is outputted by the signal-generating unit 200. In the case of difference signal HV=0, the pixel value of each pixel in the intermediate image data S3 is set to the average value of the pixel value of the pixel in the N frame and the pixel value in the N+1 frame.

In the case of difference signal HV=1, there is searched a pixel being at a position closest to that of the above pixel and that yields a difference signal HV=0 (i.e. a pixel having a previous-next frame difference absolute value smaller than a predefined value). The average value of the pixel value of the found pixel in the N frame and of the pixel value in the N+1 frame is set as the pixel value of the pixel in the intermediate image data S3. In Embodiment 1, the positional shift of the boundary portion (edge portion) between object and background between sub-frames is reduced through creation of the Lo image from the intermediate image data and through inter-frame insertion of the Lo image. As a result, it becomes possible to suppress perception of motion blur during visual tracking. Embodiment 1 allows therefore reducing motion blur during visual tracking of a fast-moving input image, also upon frame rate conversion in accordance with a drive distribution method.

(Embodiment 2)

A second embodiment of the image-processing device and control method thereof according to the present invention will be explained next. In Embodiment 2 an instance will be explained wherein an input image having a frame rate of 60 Hz undergoes frame rate conversion to 180 Hz. Embodiment 2 will be explained next with reference to accompanying drawings.

Embodiment 2 differs from Embodiment 1 in that the process flow of the signal-generating unit 200, and of the horizontal-searching unit 302 and the vertical-searching unit 303 of the first image-generating unit 300 are now different from those of Embodiment 1. The process flows of the signal-generating unit 200, the horizontal-searching unit 302 and the vertical-searching unit 303 will be explained next. Processing units other than the signal-generating unit 200 are set to execute processes identical to those of Embodiment 1. These processing units will be denoted by the same reference symbols, and a detailed explanation thereof will be omitted.

Figure 8:
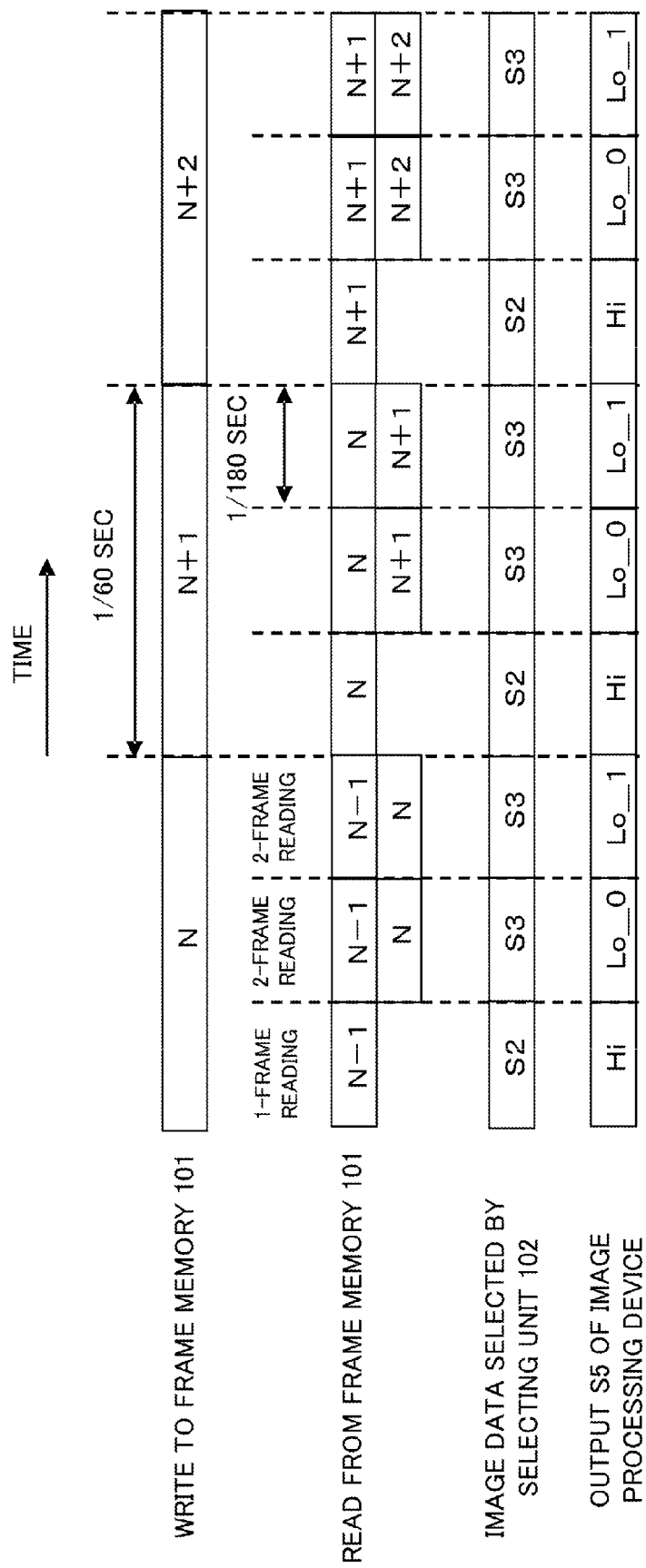
FIG. 8 is a timing chart of Embodiment 2.

FIG. 8 is a timing chart illustrating the operation of Embodiment 2. In the figure, N, N+1 and N+2 denote the frame numbers of the input image, such that a larger number translates into a newer frame in time. Image writing and reading timings in the frame memory 101 will be explained with reference to FIG. 8. The input image is written on the frame memory 101 at a frame rate of 60 Hz. The image is read from the frame memory 101 at a frame rate of 180 Hz, as illustrated in FIG. 8. In Embodiment 2, one frame period is divided into three sub-frame periods, such that a pre-emphasized sub-frame (Hi image) is displayed at the first sub-frame period, and a first and a second de-emphasized sub-frame (Lo_0 image, Lo_1 image) are displayed at a second and a third sub-frame period.

As illustrated in FIG. 8, image reading from the frame memory 101 is performed by performing, alternately, two-frame simultaneous reading twice, and one-frame reading once. Image data for two frames is necessary in order to create the Lo_0 image and the Lo_1 image, while image data for one frame is necessary in order to create the Hi image. The Lo_0 image is an image of a sub-frame the time-axial position (temporal position) whereof is closer to the N frame, from among the sub-frames for which a de-emphasized sub-frame is displayed. The Lo_1 image is the image of a sub-frame the time-axial position whereof is closer to the N+1 frame, from among the sub-frames to be created. Specifically, the Lo_0 image is a Lo image that is displayed temporally earlier, from among two Lo images, and the Lo_1 image is a Lo image that is displayed temporally later, from among the two Lo images. The image data S1, S2 illustrated in FIG. 1 denote image data that is read alternately from the frame memory 101. The image data S1 is read to create the Lo_0 image and the Lo_1 image, and the image data S2 is read to create the Hi image.

<Operation to Output the Lo Image>

The operation to output the Lo_0 image and the Lo_1 image will be explained next. An example will be explained of a timing such that the two-frame image data S1 read from the frame memory 101 involves an N frame and an N+1 frame.

The signal-generating unit 200 receives the image data S1 and outputs a difference signal HV. The signal-generating unit 200 detects the direction of motion of a pixel having a small difference of the N frame and the N+1 frame (previous-next frame difference), and of a pixel having a large difference. The difference signal HV is a signal of five values, as follows.

$$HV = 0 \text{(pixel having a previous-next frame difference} \quad \text{(Expression 4)}$$
$$\text{equal to or smaller than a predefined value)}$$
$$= 1 \text{(previous-next frame difference larger than}$$
$$\text{predefined value, horizontal rightward motion}$$
$$\text{pixel)}$$
$$= 2 \text{(previous-next frame difference larger than}$$
$$\text{predefined value, horizontal leftward motion}$$
$$\text{pixel)}$$
$$= 3 \text{(previous-next frame difference larger than}$$
$$\text{predefined value, vertical upward motion}$$
$$\text{pixel)}$$
$$= 4 \text{(previous-next frame difference larger than}$$
$$\text{predefined value, vertical downward motion}$$
$$\text{pixel)}$$

In Embodiment 2 there are detected two types of motion direction, horizontal and vertical, but the motion directions that are detected are not limited thereto, and some other direction, or more directions, may alternatively be detected.

Figure 9A:
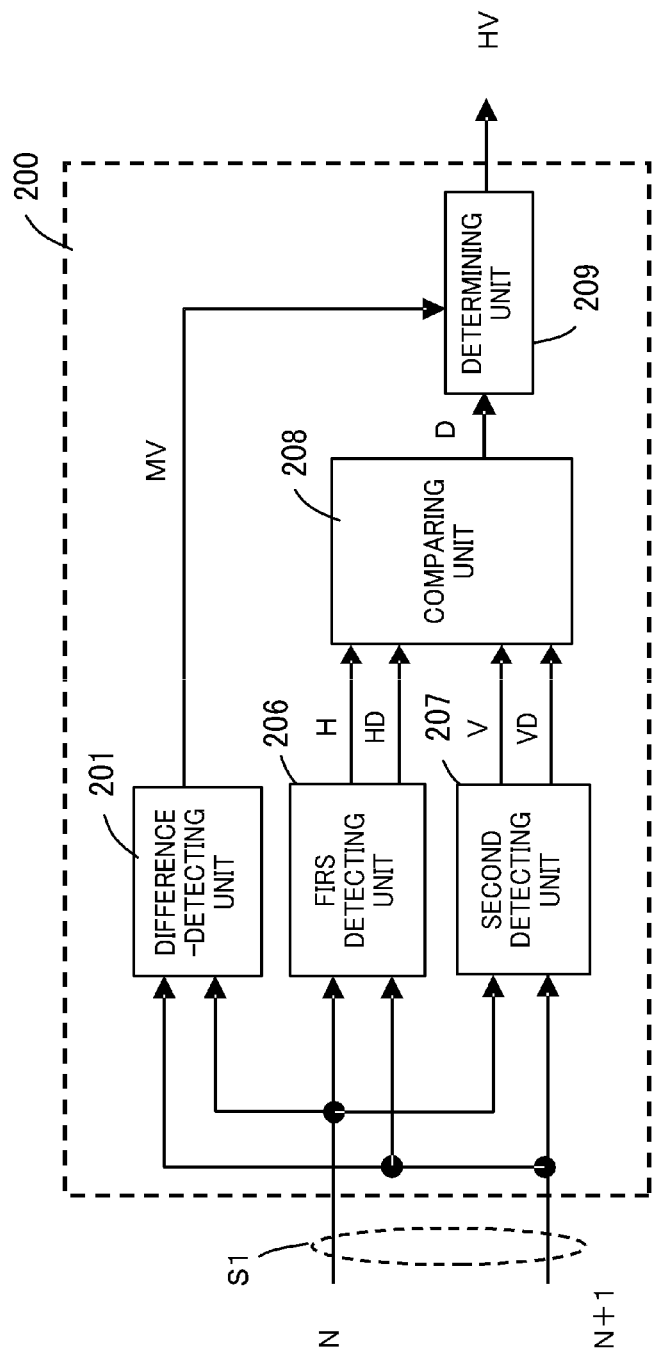
FIG. 9A and FIG. 9B are block diagrams of a signal-generating unit 200 and an first image-generating unit 300 of Embodiment 2.

The details of the signal-generating unit 200 will be explained with reference to FIG. 9A. FIG. 9A is a block diagram of the signal-generating unit 200. The signal-generating unit 200 has the difference-detecting unit 201, a first detecting unit 206, a second detecting unit 207, a comparing unit 208 and a determining unit 209. The image data of the N frame and the N+1 frame are inputted to the difference-detecting unit 201, the first detecting unit 206 and the second detecting unit 207.

The difference-detecting unit 201 calculates a difference absolute value of pixel value of a pixel of identical coordinates in the N frame and the N+1 frame. The difference-detecting unit 201 compares the calculated difference absolute value with a predefined value set beforehand, and outputs 1, as the motion signal MV, if the difference absolute value is larger than a predefined value, and 0 if the difference absolute value is equal to or smaller than a predefined value.

The first detecting unit 206, the second detecting unit 207 and the comparing unit 208 detect whether the pixel of interest is of horizontal rightward motion, horizontal leftward motion, vertical upward motion or vertical downward motion.

The first detecting unit 206 calculates respective difference absolute values between the pixel value N(x, y) of a pixel of interest in the N frame and the pixel value of each pixel within a predefined range, in the horizontal direction, centered on the pixel of interest, in the N+1 frame. The predefined range is set to [x−c, x+c] (c is a constant), where x is the coordinate of the pixel of interest. The first detecting unit 206 calculates respective difference absolute values between the pixel value N(x, y) in the N frame and pixel values N+1(x−c, y), N+1(x−c+1, y), . . . , N+1(x+c−1, y), N+1(x+c, y) in the N+1 frame. The first detecting unit 206 outputs a minimum value H from among the plurality of difference absolute values that are calculated. The first detecting unit 206 outputs 1, as the horizontal direction signal HD, in a case where the motion detected on the basis of the pixel of minimum value H is rightward motion, and 0 in the case of leftward motion. In a case where there is a pixel in the horizontal motion, the pixel value of the pixel of interest in the N frame and the pixel value of any one pixel within the horizontal predefined range in the N+1 frame exhibit close values, and the minimum value H takes on accordingly a small value.

The second detecting unit 207 performs the same process as the first detecting unit 206, but in the vertical direction, and outputs the minimum value V. The second detecting unit 207 outputs 1, as the vertical direction signal VD, in a case where the motion detected on the basis of the pixel of minimum value V is upward motion, and 0 in the case of downward motion.

The comparing unit 208 generates the direction signal D, in accordance with Expression 5 below, on the basis of the minimum value H, the minimum value V, the horizontal direction signal HD and the vertical direction signal VD.

$$\begin{aligned}D = {}& 0\,(\text{case where minimum value } H \text{ is equal to or} \\ & \text{smaller than minimum value } V, \text{ with horizontal} \\ & \text{rightward motion}) \\ = {}& 1\,(\text{case where minimum value } H \text{ is equal to or} \\ & \text{smaller than minimum value } V, \text{ with horizontal} \\ & \text{leftward motion}) \\ = {}& 2\,(\text{case where minumum value } H \text{ is larger than} \\ & \text{minimum value } V, \text{ with vertical upward motion}) \\ = {}& 3\,(\text{case where minimum value } H \text{ is larger than} \\ & \text{minimum value } V, \text{ with vertical downward motion})\end{aligned}$$

(Expression 5)

In the case of a pixel with motion in an oblique direction, there is detected the horizontal direction or vertical direction having the higher correlation with the direction of oblique motion.

The determining unit 209 generates the difference signal HV on the basis of the motion signal MV and the direction signal D, in accordance with Expression 6 below.

$$\begin{aligned}HV = {}& 0\,(\text{case where motion signal } MV = 0) \\ = {}& 1\,(\text{case where motion signal } MV = 1 \text{ and direction} \\ & \text{signal } D = 0) \\ = {}& 2\,(\text{case where motion signal } MV = 1 \text{ and direction} \\ & \text{signal } D = 1) \\ = {}& 3\,(\text{case where motion signal } MV = 1 \text{ and direction} \\ & \text{signal } D = 2) \\ = {}& 4\,(\text{case where motion signal } MV = 1 \text{ and direction} \\ & \text{signal } D = 3)\end{aligned}$$

(Expression 6)

In Embodiment 2, the motion direction is detected on the basis of horizontal difference detection and vertical difference detection, as described above, but motion direction detection is not limited to that method, and for instance some other motion detection scheme by block matching may be resorted to.

The first image-generating unit 300 receives the difference signal HV outputted by the signal-generating unit 200, and outputs the intermediate image data S3. The pixel value of each pixel in the intermediate image data S3 is set to the average value of the previous and next frames in the case of a pixel the difference signal HV of which is 0 (pixel of small previous-next frame difference), and is set to a pixel value obtained as a result of the below-described search in the case of a pixel the difference signal HV of which is other than 0 (pixel of large previous-next frame difference). In the search method of Embodiment 2, the search pitches in the left-right direction and the up-down direction vary depending on the time-axial positions of the generated intermediate images and on the image motion direction. The ratio of search pitch in the left-right direction or the up-down direction are each set to 1:2 or 2:1 in a case of frame rate conversion where the frame rate of the input image is increased three-fold.

Figure 9B:
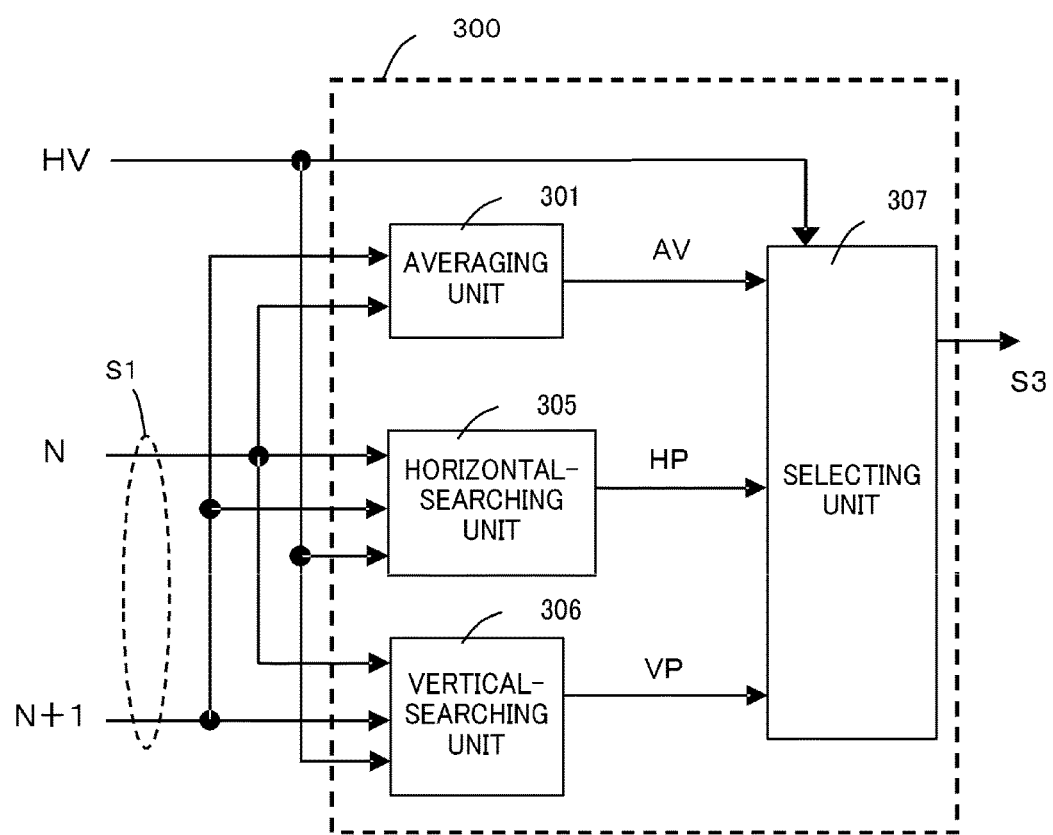

The details of the first image-generating unit 300 will be explained next with reference to FIG. 9B. FIG. 9B is a block diagram of the first image-generating unit 300. The first image-generating unit 300 has the averaging unit 301, a horizontal-searching unit 305, a vertical-searching unit 306 and a selecting unit 307.

The averaging unit 301 calculates an average value AV of the pixel values of a pixel of identical coordinates in the N frame and the N+1 frame. The averaging unit 301 outputs the calculated average value AV to the selecting unit 307.

Figure 10A:
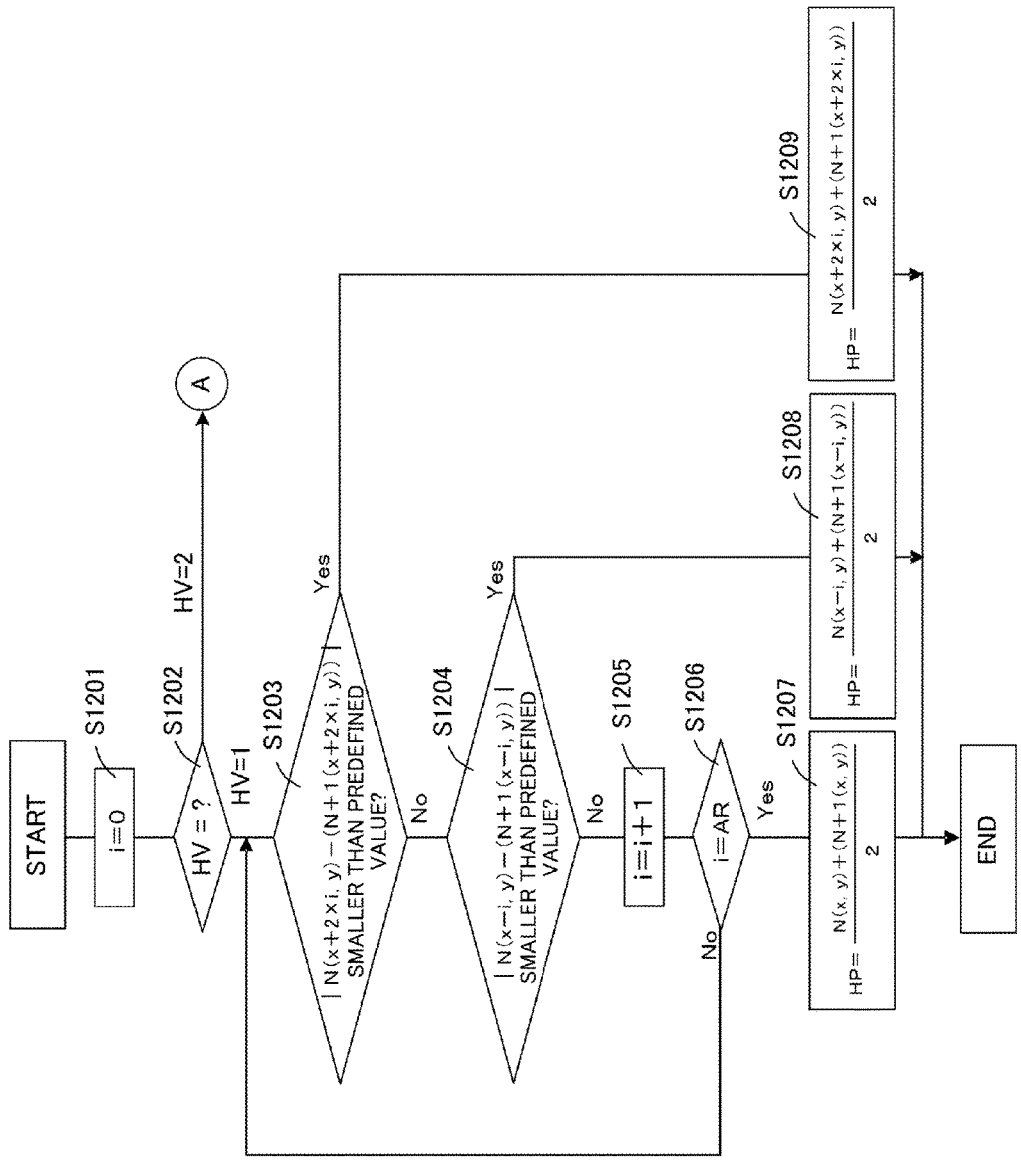
FIG. 10A and FIG. 10B are a flowchart for explaining the operation of the first image-generating unit 300 of Embodiment 2.
Figure 10B:
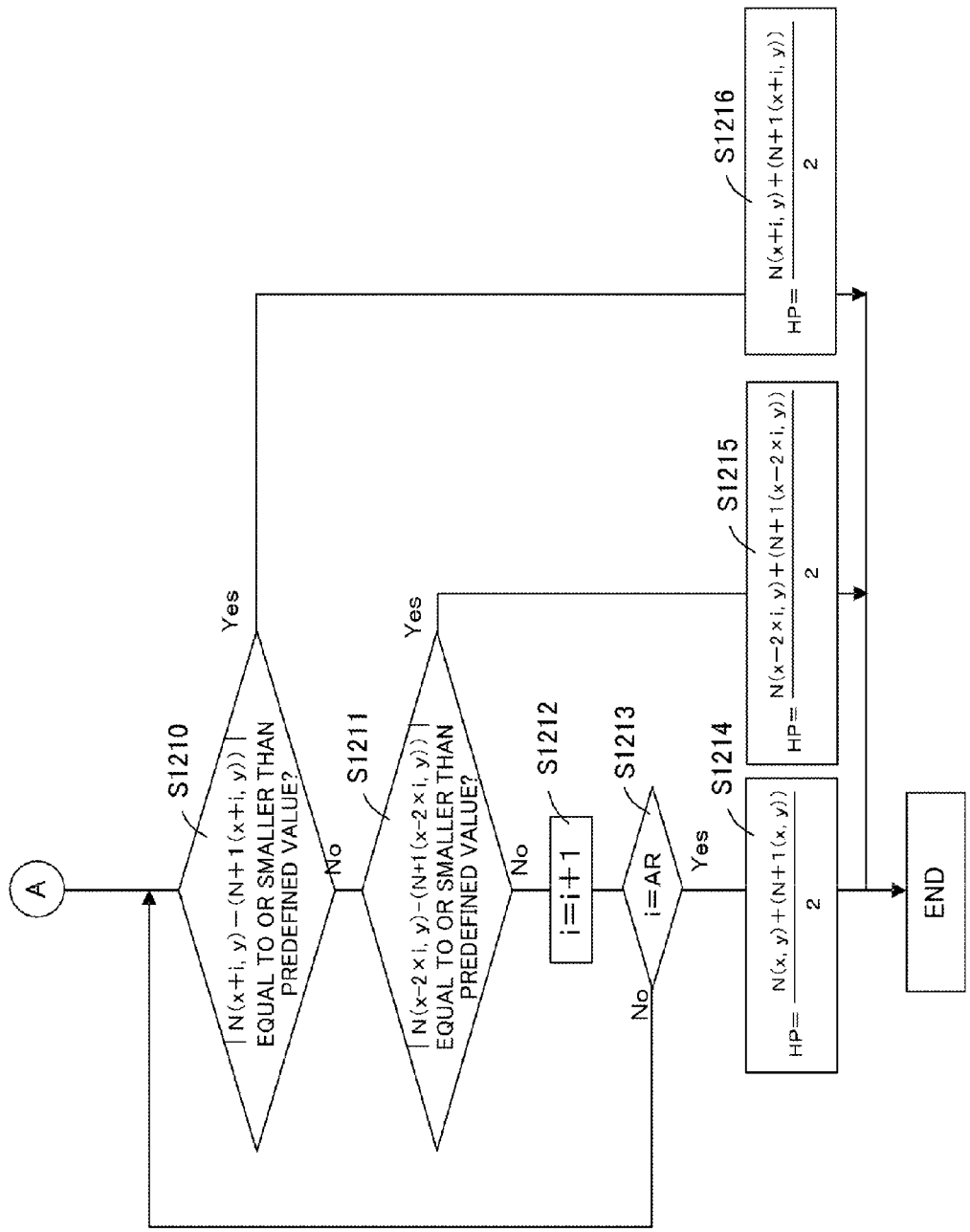
Figure 11A:
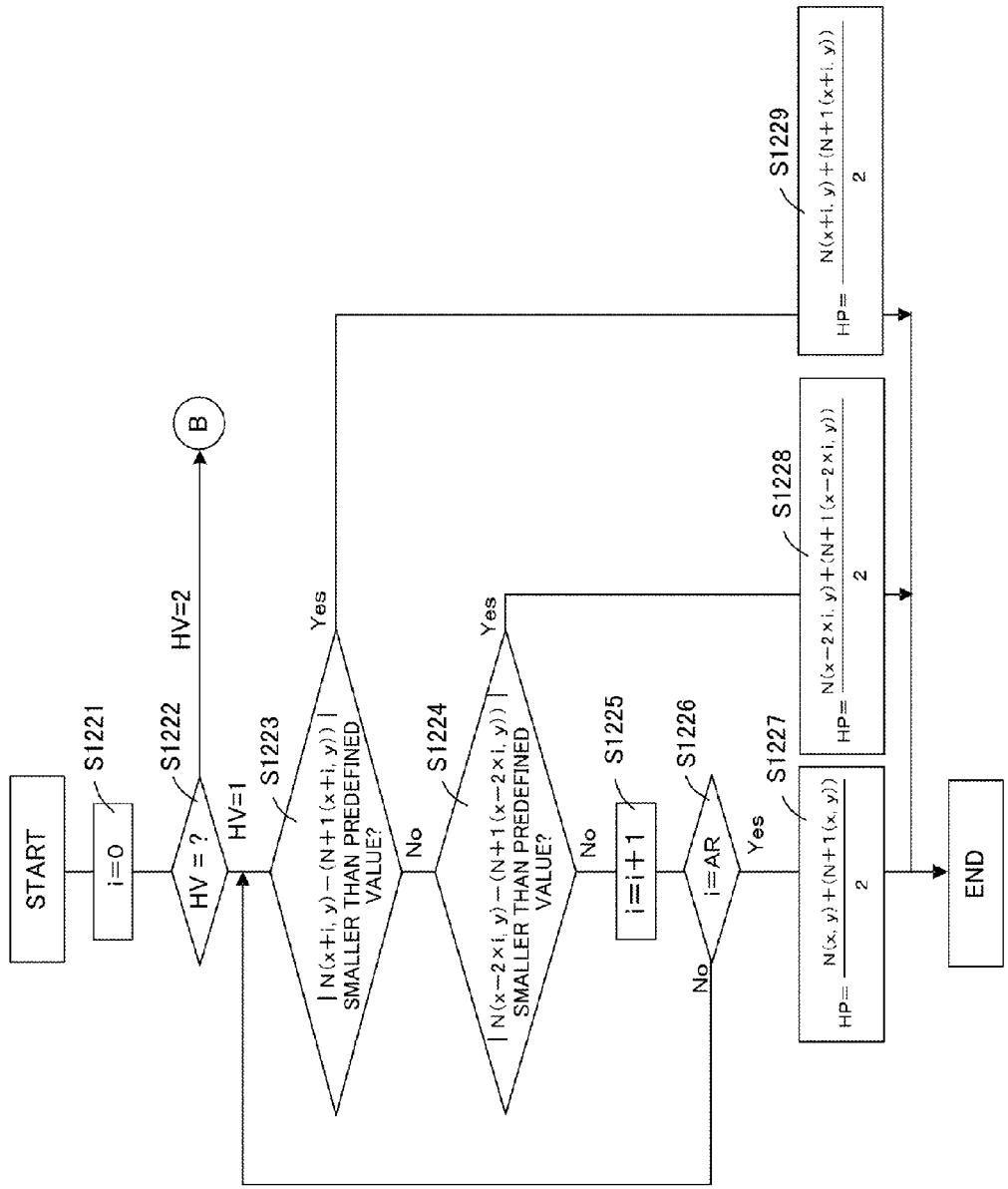
FIG. 11A and FIG. 11B are a flowchart for explaining the operation of the first image-generating unit 300 of Embodiment 2.
Figure 11B:
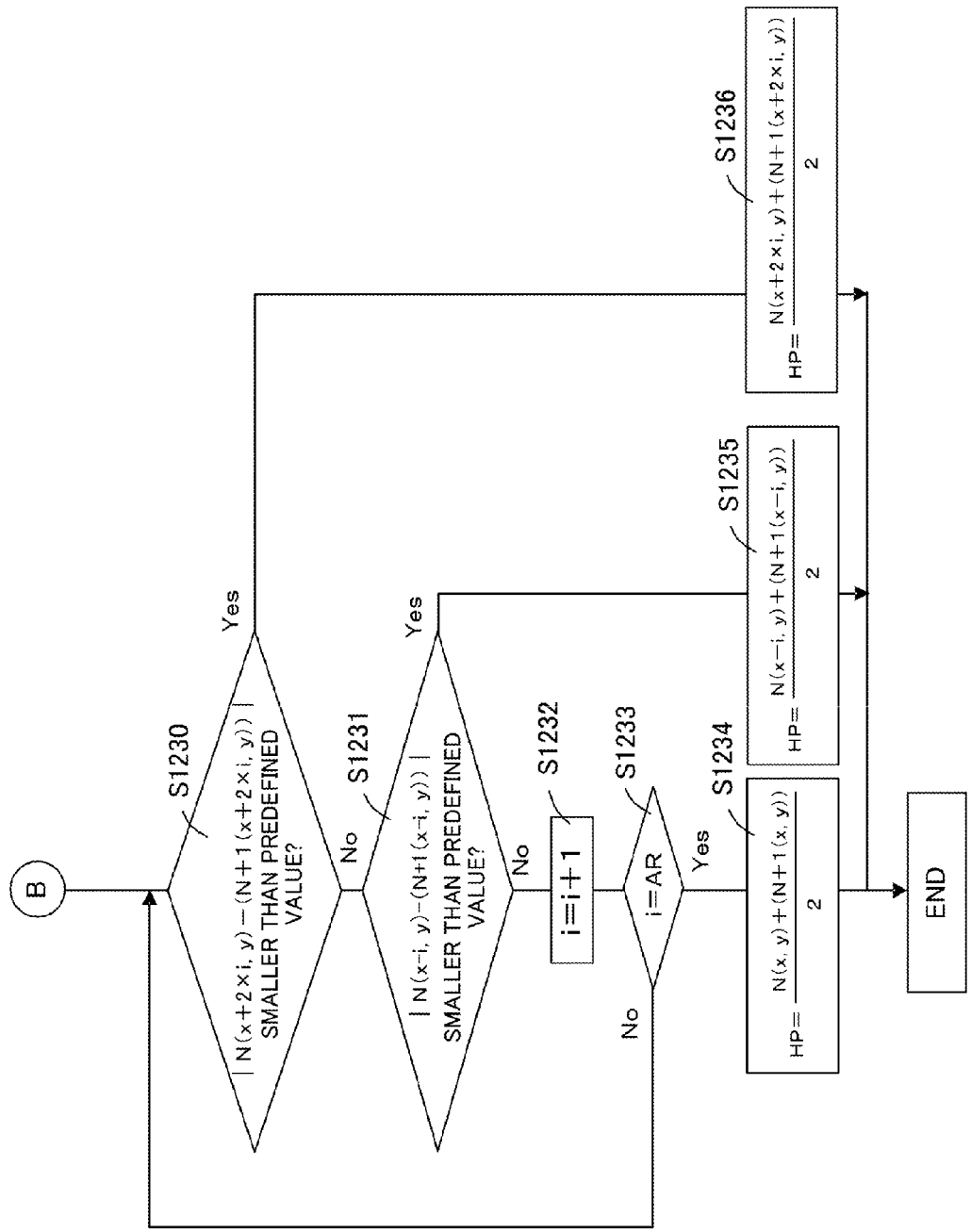

The horizontal-searching unit 305 sequentially calculates, in order from a pixel that is positioned close to the coordinate of the pixel of interest, a respective difference absolute value (previous-next frame difference absolute value) of the pixel value of the above pixel in the N frame, and the pixel value in the N+1 frame, to search a pixel of small previous-next frame difference absolute value. The horizontal-searching unit 305 calculates, and outputs, the pixel value HP of the pixel of interest, on the basis of the pixel value of the found pixel. FIG. 10A and FIG. 10B illustrate a process flow diagram of the horizontal-searching unit 305 upon creation of the Lo_0 image. FIG. 11A and FIG. 11B illustrate a process flow diagram of the horizontal-searching unit 305 upon creation of the Lo_1 image. In the figures, (x, y) denotes the coordinate value of the pixel of interest, i denotes the counter for shifting the coordinate value during the search, and AR denotes the predefined value that delimits the search range.

The process flow of creation of the Lo_0 image will be explained with reference to FIG. 10A and FIG. 10B.

In step S1201, the horizontal-searching unit 305 initializes the counter i to 1.

In step S1202 it is determined whether the pixel of interest is moving rightward or leftward. If the pixel of interest is moving rightward, (if HV=1) the process proceeds to step S1203.

Step S1203 to step S1206 constitute a loop. In this loop, the horizontal-searching unit 305 sequentially calculates, in order from a pixel that is positioned close to the coordinate (x, y) of the target pixel, a respective difference absolute value of the pixel value of the above pixel in the N frame and the pixel value in the N+1 frame, to search a pixel having a small difference absolute value.

In step S1203, the horizontal-searching unit 305 determines whether the previous-next frame difference absolute value of a search coordinate (x+2×i, y) is smaller than a predefined value. If the previous-next frame difference absolute value is smaller than a predefined value (S1203: Yes), the process proceeds to step S1209, if the previous-next frame difference absolute value is equal to or greater than the predefined value (S1203: No), the process proceeds to step S1204.

In step S1204, the horizontal-searching unit 305 determines whether the previous-next frame difference absolute value of the search coordinate (x−i, y) is smaller than a predefined value. If the previous-next frame difference absolute value is smaller than a predefined value (S1204: Yes), the process proceeds to step S1208, if the previous-next frame difference absolute value is equal to or greater than the predefined value (S1204: No), the process proceeds to step S1205.

In step S1205, the horizontal-searching unit 305 increments the counter i, and determines in step S1206 whether the search of the predefined range is completed or not.

In steps S1207, 1208 and 1209, the horizontal-searching unit 305 calculates the respective pixel value HP of the pixel of interest of instances where the pixel of interest is moving rightward.

In step S1207, the horizontal-searching unit 305 sets the pixel value HP of the pixel of interest to the average value of the pixel values of the pixel of interest in the previous and next frames.

In step S1208, the horizontal-searching unit 305 sets the pixel value HP of the pixel of interest to the average value of the pixel values of the pixel in the previous and next frames having a search coordinate (x−i, y).

In step S1209, the horizontal-searching unit 305 sets the pixel value HP of the pixel of interest to the average value of the pixel values of the pixel in the previous and next frames having a search coordinate (x+2×i, y).

If in step S1202 it is determined that the pixel of interest is moving leftward (HV=2), the process proceeds to step S1210. If HV in step S1202 is neither 1 nor 2, the process in the flowchart is terminated.

Steps S1210 to 1213 constitute a loop. In this loop, the horizontal-searching unit 305 sequentially calculates, in order from a pixel that is positioned close to the coordinate (x, y) of the target pixel, a respective difference absolute value (previous-next frame difference absolute value) of the pixel value of the above pixel in the N frame and the pixel value in the N+1 frame, to search a pixel having a small difference absolute value.

In step S1210, the horizontal-searching unit 305 determines whether the previous-next frame difference absolute value of the search coordinate (x+i, y) is smaller than a predefined value. If the previous-next frame difference absolute value is smaller than a predefined value (S1210: Yes), the process proceeds to step S1216; if the previous-next frame difference absolute value is equal to or greater than the predefined value (S1210: No), the process proceeds to step S1211.

In step S1211, the horizontal-searching unit 305 determines whether the previous-next frame difference absolute value of the search coordinate (x−2×+i, y) is smaller than a predefined value. If the previous-next frame difference absolute value is smaller than a predefined value (S1211: Yes), the process proceeds to step S1215; if the previous-next frame difference absolute value is equal to or greater than the predefined value (S1211: No), the process proceeds to step S1212.

In step S1212, the horizontal-searching unit 305 increments the counter i, and determines in step S1213 whether the search of the predefined range is completed or not.

In steps S1214, 1215 and 1216, the horizontal-searching unit 305 calculates the respective pixel value HP of the pixel of interest of instances where the pixel of interest is moving leftward.

In step S1214, the horizontal-searching unit 305 sets the pixel value HP of the pixel of interest to the average value of the pixel values of the pixel of interest in the previous and next frames.

In step S1215, the horizontal-searching unit 305 sets the pixel value HP of the pixel of interest to the average value of the pixel values, in a previous and a next frame, of the pixel having a search coordinate (x−2×i, y).

In step S1216, the horizontal-searching unit 305 sets the pixel value HP of the pixel of interest to the average value of the pixel value, in the previous and next frames, of the pixel having the search coordinate (x+i, y).

The process flow of creation of the Lo_1 image will be explained with reference to FIG. 11A and FIG. 11B.

FIG. 11A and FIG. 11B are process flowcharts of the same flow as in FIG. 10A and FIG. 10B. In FIG. 11A and FIG. 11B, the conditional expressions are different from those of steps S1203, 1204, 1210 and 1211 in FIG. 10A and FIG. 10B and the calculation expressions are different from those of steps S1208, 1209, 1215 and 1216 in FIG. 10A and FIG. 10B. The horizontal-searching unit 305 performs a process on the basis of the conditional expressions of steps S1223, 1224, 1230 and 1231 in FIG. 11A and FIG. 11B. The Lo_1 image is created through calculation of the pixel value HP of a pixel of interest using the calculation expressions steps S1227, 1228, 1229, 1234, 1235 and 1236.

In the flow of FIG. 10A, FIG. 10B, FIG. 11A and FIG. 11B there is set a predefined range of search, for each intermediate image, in accordance with the time-axial position of insertion of the intermediate image between the N-th frame image and the (N+1)-th frame image. The predefined range comprises a range set in the motion direction of the moving object, from the target pixel (horizontal direction rightward orientation), and a range set in an opposite direction (horizontal direction leftward orientation) of the motion direction, from the target pixel. The closer the time-axial position of insertion of the intermediate image is to the N-th frame image, the wider is the predefined range in the motion direction. The closer the time-axial position of insertion of the intermediate image to the (N+1)-th frame image, the wider is the range in the direction opposite the motion direction.

If the motion direction is of horizontal rightward orientation in the generation of the Lo_0 image close to the N-th frame image (S1202: HV=1), there is searched a wide range from the target pixel, in the rightward direction, as denoted by the expressions in S1203 and S1204. If the motion direction is of horizontal leftward orientation (S1202: HV=2), there is searched a wide range from the target pixel, in the leftward direction, as denoted by the expressions in S1210 and S1211.

If the motion direction is of horizontal rightward orientation in the generation of the Lo_1 image close to the (N+1)-th frame image (S1222: HV=1), there is searched a wide range from the target pixel, in the leftward direction, as denoted by the expressions in S1223 and S1224. If the motion direction is of horizontal leftward orientation (S1222: HV=2), there is searched a wide range from the target pixel, in the rightward direction, as denoted by the expressions in S1230 and S1231.

The vertical-searching unit 306 performs the same process as the horizontal-searching unit 305, but in the vertical direction, to calculate the pixel value VP.

The selecting unit 307 selects any one of the average value AV, the pixel value HP and the pixel value VP, in accordance with the difference signal HV outputted by the signal-generating unit 200, and outputs the selection as the intermediate image data S3. The selecting unit 307 selects the average value AV, the pixel value HP or the pixel value VP on the basis of Expression 7 below.

$$S3 = AV(\text{difference signal } HV = 0(\text{case where previous-next difference is small}))$$
$$= HP(\text{case where difference signal } HV = 1, \text{ or } 2(\text{horizontal motion}))$$
$$= VP(\text{case where difference signal } HV = 3, \text{ or } 4(\text{vertical motion}))$$

(Expression 7)

FIG. 5C is a diagram for explaining the operation of the first image-generating unit 300. FIG. 5A illustrates an image at an N frame and an N+1 frame. In the N frame and N+1 frame, a white-square object moves from the left to the right against a black background, as illustrated in the figure. Herein, Q0 is set as the pixel value of the black background and Q1 as the pixel value of the object. FIG. 5C is a diagram illustrating the pixel value of a pixel at a position denoted by line A in FIG. 5A.

The pixel in the motion region (x0≤x≤x1) flanked by the coordinates x0, x1 in FIG. 5C yields a difference signal HV=1, and yields a difference signal HV=0 at a region (x<x0, x1<x) other than the motion region. The first image-generating unit 300 sets, as the pixel value of the pixels of difference signal HV=0, the average value of the pixel value of the pixel in the N frame and the pixel value in the N+1 frame. Accordingly, the pixel value of the pixels of the x<x0 region is Q1, and the pixel value of the pixels of the x>x1 region is Q0, as denoted by the intermediate image data S3 of FIG. 5C. The pixels of difference signal HV=1 take on the pixel value created by the horizontal-searching unit 305. In the Lo_0 image, the left ⅓ region within the pixel region (x0≤x≤x1) of difference signal HV=1 takes on the pixel value Q1, and the right ⅔ region takes on the pixel value Q0. In the Lo_1 image, the left ⅔ region within the pixel region (x0≤x≤x1) of difference signal HV=1 takes on the pixel value Q1, and the right ⅓ region takes on the pixel value Q0. Thus, the frame rate is increased through insertion, between the N-th frame image and the (N+1)-th frame image, of a plurality of intermediate images, Lo_0 and Lo_1, having mutually different positions of the boundary between the moving object and the background, within the motion region.

The positional shift of the boundary portion (edge portion) of the object and the background, between sub-frames, is thus reduced through insertion of the generated intermediate image data S3 (Lo_0) and S3 (Lo_1) between the N frame and the N+1 frame. As a result, it becomes possible to suppress perception of motion blur during visual tracking.

The selecting unit 102 of FIG. 1 alternately switches, at 180 Hz, between the image data S2 read from the frame memory 101 and the image data S3 outputted by the first image-generating unit 300, and outputs the data as the image data S4. Upon display of the Hi image, the selecting unit 102 selects the image data S2, and upon display of the Lo_0 image and Lo_1 image, the selecting unit 102 selects the image data S3. The distributing unit 400 alternately outputs the Hi image, the Lo_0 image and the Lo_1 image at 180 Hz.

The image-processing device of Embodiment 2 generates the intermediate image data S3 on the basis of the difference signal HV that is outputted by the signal-generating unit 200. In the case of difference signal HV=0, the pixel value of each pixel in the intermediate image data S3 is set to the average value of the pixel value of the pixel in the N frame and the pixel value in the N+1 frame. In a case other than signal HV=0, there is searched a pixel being at a position closest to that of the above pixel and that yields a difference signal HV=0 (i.e. a pixel having a previous-next frame difference absolute value smaller than a predefined value). The average value of the pixel value of the found pixel in the N frame and of the pixel value in the N+1 frame is set as the pixel value of the pixel in the intermediate image data S3. In Embodiment 2, this search is performed in the left-right direction or the up-down direction, in accordance with the motion direction of the image motion direction, but a weight is further added to the search pitch, in accordance with the time-axial position of the generated intermediate image data (depending on whether the position is close to the N frame, or close to the N+1 frame). The positional shift of the boundary portion (edge portion) between object and background between sub-frames is reduced through creation, and inter-frame insertion, of such intermediate image data. It becomes accordingly possible to suppress perception of motion blur during visual tracking. Embodiment 2 allows therefore reducing motion blur during visual tracking, also upon frame rate conversion, in accordance with a drive distribution method, of a fast-moving input image.

In Embodiment 2 a method has been described wherein the frame rate of the input image is increased three-fold, but Embodiment 2 is not limited thereto, and may be also in an instance where the frame rate is increased K-fold (K: natural number). In this case, it is sufficient to appropriately set, in accordance with a frame rate magnifications, the generated weight for the time-axial position of the intermediate image and that is to be added to the search pitch of a case of search of a pixel such that the previous-next frame difference absolute value according to the image motion direction at the time of generation of the intermediate image is smaller than a predefined value.

(Embodiment 3)

A third embodiment of the image-processing device and control method thereof according to the present invention will be explained next. The configuration of the image-processing device of Embodiment 3 is identical to that of the image-processing device of Embodiment 1 illustrated in FIG. 1. Embodiment 3 differs from Embodiment 1 as regards the configuration and function of the first image-generating unit 300. The explanation below will focus on differences with respect to Embodiment 1. An explanation on the details of the configuration and processes in Embodiment 1 will be omitted.

The first image-generating unit 300 receives the difference signal HV outputted by the signal-generating unit 200, and outputs the intermediate image data S3. In the case of a pixel of difference signal HV being 0 (pixel of small previous-next frame difference), the first image-generating unit 300 sets the intermediate image data S3 to the average value of the previous and next frames. In the case of a pixel of difference signal HV other than 0 (pixel of large previous-next frame difference), the intermediate image data S3 is set to a value calculated from pixel values of previous and next frames derived from a below-described interpolation calculation.

Figure 12A:
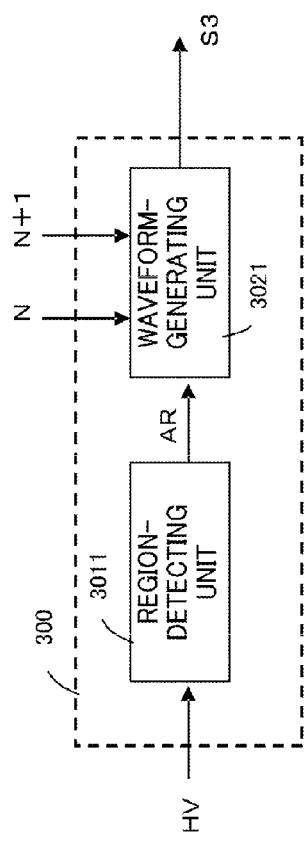
FIG. 12A and FIG. 12B are block diagrams of an first image-generating unit 300 of Embodiment 3 and Embodiment 4.

The details of the first image-generating unit 300 will be explained next with reference to accompanying drawings. FIG. 12A is a block diagram of the first image-generating unit 300. The first image-generating unit 300 has a region-detecting unit 3011 and a waveform-generating unit 3021.

The region-detecting unit 3011 detects a region (hereafter referred to as motion region) of motion, in the horizontal direction or the vertical direction, on the basis of the difference signal HV, and outputs a region signal AR. In Embodiment 3, the region signal AR takes on the coordinate values at both ends of the motion region, and any one value from among 0, 1 and 2, as denoted by Expression 8.

$$AR = 0, 0, 0 \text{(case of difference signal } HV = 0)$$ (Expression 8)

$$= x\text{-coordinate value at both ends, in the horizontal direction, of the motion region; 1(case of difference signal } HV = 1)$$

$$= y\text{-coordinate value at both ends, in the vertical direction, of the motion region; 2(case of difference signal } HV = 2)$$

Herein, the x-coordinate values at both ends of the motion region, in the horizontal direction, are the x-coordinate values of pixels, having a difference signal HV of 1, that are adjacent, in the horizontal direction, to a pixel having a difference signal HV that is not 1. The y-coordinate values at both ends of the motion region, in the vertical direction, are the y-coordinate values of pixels, having a difference signal HV of 2, that are adjacent, in the vertical direction, to a pixel having a difference signal HV that is not 2.

Figure 13A:
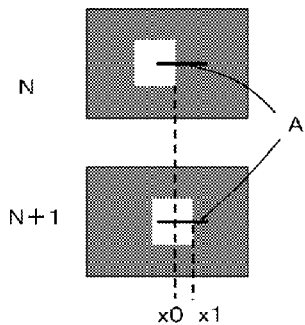
FIG. 13A to FIG. 13E are diagrams illustrating the operation of an first image-generating unit 300 and the appearance of an output image in Embodiment 3.
Figure 13B:
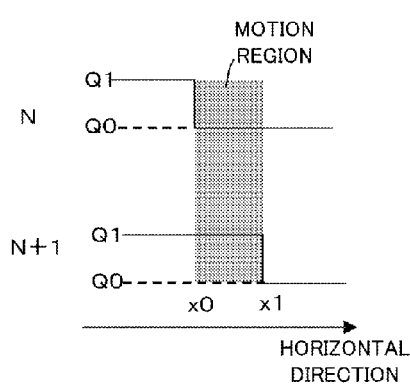
Figure 13C:
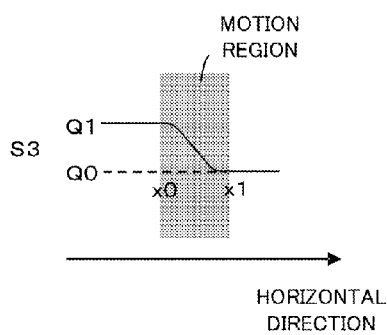

FIG. 13A to FIG. 13C are diagrams for explaining the operation of the first image-generating unit 300. FIG. 13A illustrates an image at an N frame and an N+1 frame. In the N frame and N+1 frame, a white-square object moves from the left to the right against a black background, as illustrated in the figure. Herein, Q0 is set as the pixel value of the black background and Q1 as the pixel value of the object. FIG. 13B is a diagram illustrating the pixel values of pixels of one line denoted by line A in FIG. 13A. The shaded region in FIG. 13B is a horizontal motion region of difference signal HV=1. In this case, the region signal AR of each pixel within the motion region illustrated in FIG. 13B is set to (x0, x1, 1) by the region-detecting unit 3011.

The waveform-generating unit 3021 generates the intermediate image data S3 from the region signal AR, the N frame image data and the N+1 frame image data. In the intermediate image data S3, the waveform-generating unit 3021 calculates the pixel value of a pixel at the motion region (region of large previous-next frame difference, region where the third element of the region signal AR is =1 or 2) through interpolation of pixel values of the pixel in a previous and a next frame, according to a predefined interpolation function (cos curve).

FIG. 13C illustrates a waveform of the intermediate image data S3 as calculated through interpolation of the motion region using a cos curve. The waveform-generating unit 3021 interpolates image data of the motion region in such a manner that the waveform is continuously connected at both ends of the motion region, as illustrated in FIG. 13C. This interpolation is carried out on the basis of information on the amplitude and length of the cos curve, and that is held beforehand in a table not shown. In the intermediate image data S3, the waveform-generating unit 3021 sets the pixel value of a pixel of a region (region of small previous-next frame difference, region where the third element of the region signal AR is =0) other than the motion region, as the average value of the pixel value of the previous and next frames of the pixel. As a result, there is generated the intermediate image data S3 such that the pixel value changes continuously from one (Q1), from among Q1 as the pixel value of the pixel of the object adjacent to the boundary of the object and the background, and Q0 as the pixel value of the pixel of the background, to the other pixel value (Q0), in the motion direction of the object, within the motion region.

In the example illustrated in FIG. 13A to FIG. 13C, an instance has been explained of an image where an object is moving the horizontal direction, but the example is not limited thereto. In the case of an image in which the object is moving in the vertical direction, there holds difference signal HV=2 and the region signal AR is the y-coordinates at both ends, in the vertical direction, of the motion region. In the intermediate image data S3, as a result, the pixel value of the pixel at the region of one line in the vertical direction, within the range specified by the region signal AR, takes on a value resulting from interpolation, using a cos curve, of the pixel values of the pixel in the previous and next frames.

In the example explained in Embodiment 3, a cos curve is used for interpolation, but the function (waveform) that is used for interpolation is not limited thereto, and the function may be for instance a slope waveform that changes linearly, or a step waveform that changes abruptly. In this case, an intermediate image is generated such that the pixel value changes step-wise from one pixel value (Q1), from among Q1 as the pixel value of the pixel of the object adjacent to the boundary of the object and the background, and Q0 as the pixel value of the pixel of the background, to the other pixel value (Q0), in the motion direction of the object, within the motion region.

Figure 13D:
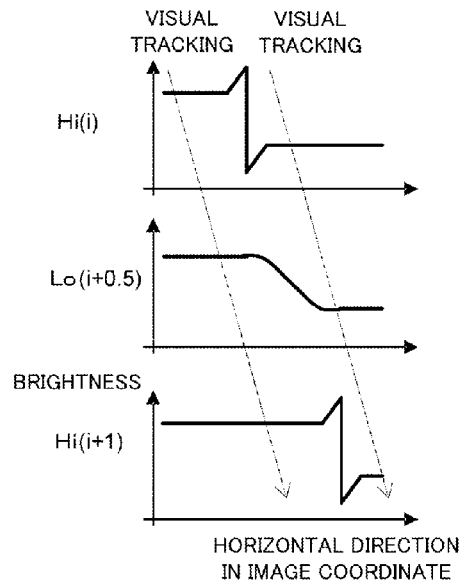
Figure 13E:
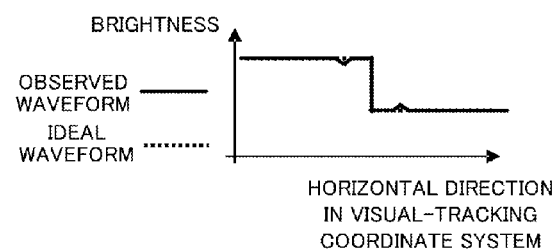

FIG. 13D and FIG. 13E are diagrams illustrating an output image in a case of alternating output of the Hi image and the Lo image in Embodiment 3, and illustrating the appearance of the output image as a waveform. FIG. 13D illustrates three frames Hi (i), Lo (i+0.5) and Hi (i+1) generated through execution of the process of Embodiment 3 on an image with motion towards the right in the horizontal direction. The motion region detected in Embodiment 3 is deemed to be a region in which there moves the boundary portion of the object and the background (edge portion), between frames. In Embodiment 3 there is generated an intermediate image through interpolation, using a cos curve, in such a manner that the image at the edge portion is disposed within this motion region, in the sub-frames. Through such inter-frame insertion, using the intermediate image as a sub-frame, there is reduced the positional shift, between sub-frames, of the boundary portion (edge portion) of the object and the background. Accordingly, it becomes possible to suppress perception of motion blur during visual tracking, as illustrated in FIG. 13E.

(Embodiment 4)

A fourth embodiment of the image-processing device and control method thereof according to the present invention will be explained next. A characterizing feature of Embodiment 4, as compared with Embodiment 3, is that upon output of the Lo image, LPF coefficients are set to be different between a region with motion and a region without motion. Specifically, the degree to which the high-frequency component of spatial frequency is de-emphasized is set to be different between the motion region and other regions, in intermediate images. Blocks that operate similarly to those of Embodiment 3 are denoted by the same reference symbols, and an explanation whereof will be omitted.

Figure 12B:
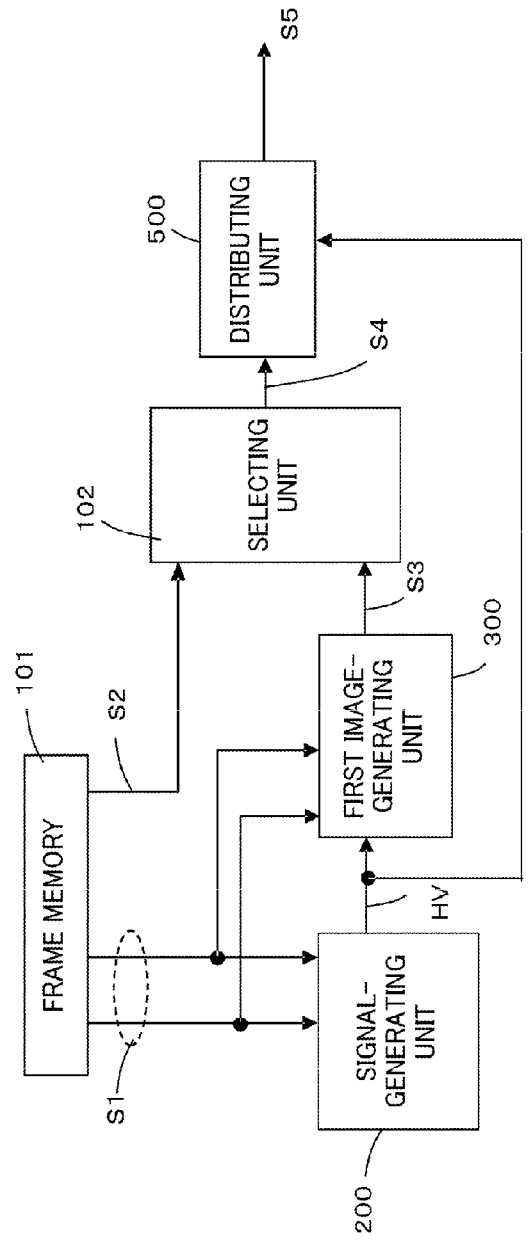

FIG. 12B is a diagram illustrating the configuration of an image-processing device of Embodiment 4. In Embodiment 4, the difference signal HV that is outputted by the signal-generating unit 200 is inputted to a distributing unit 500. The configuration and an operation of the distributing unit 500 are different from those of the distributing unit 400 in Embodiment 3.

Figure 14:
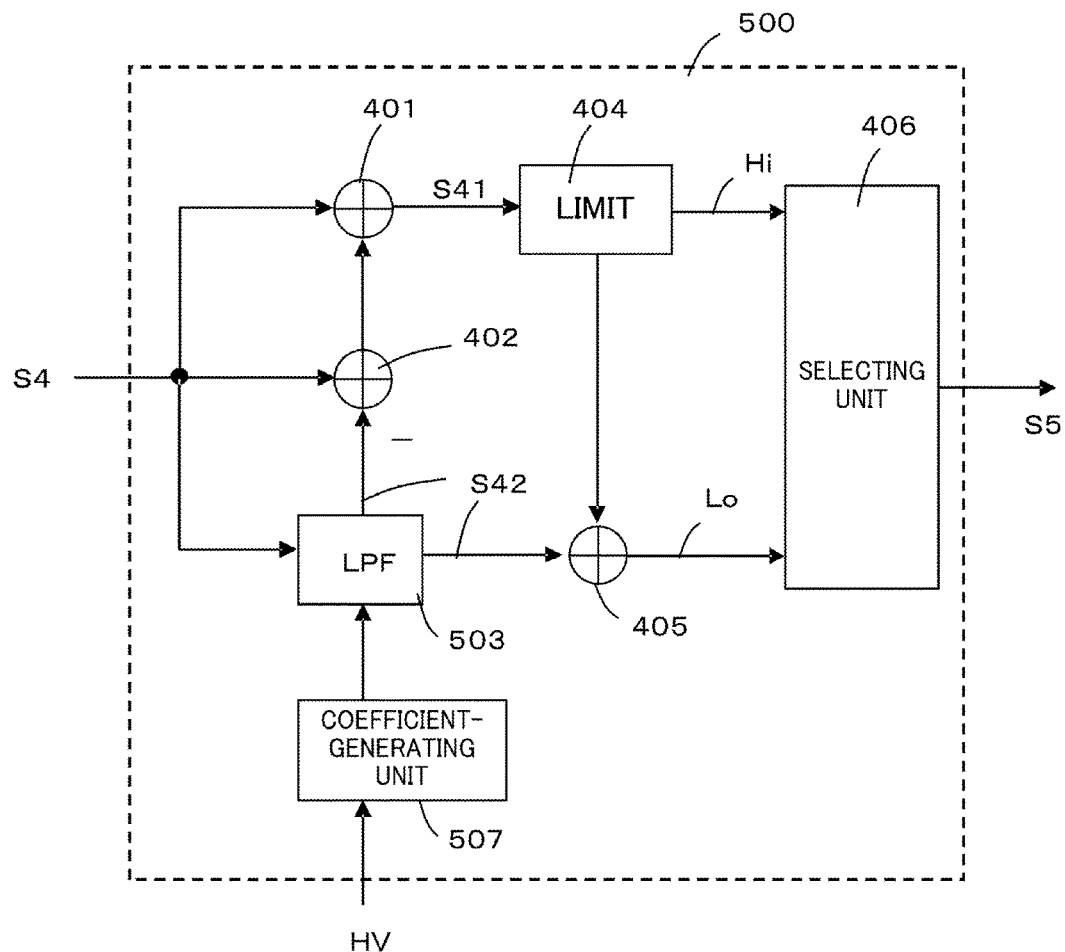
FIG. 14 is a block diagram of a distributing unit 500 of Embodiment 4.

FIG. 14 is a block diagram of the distributing unit 500. Embodiment 4 differs from Embodiment 3 in that a coefficient-generating unit 507 is added to the distributing unit 400. An LPF 503 smoothes the image data S4 by applying thereto a spatial LPF using coefficients that are inputted through the coefficient-generating unit 507, and outputs the image data S42.

Upon Lo image output, the coefficient-generating unit 507 generates different LPF coefficients between a region in which the difference signal HV is 0 (region without motion), and a region where the difference signal HV is 1 or 2 (region of horizontal or vertical motion), and outputs the generated coefficients to the LPF 503. Upon Hi image output, the coefficient-generating unit 507 generates LPF coefficients identical to the LPF coefficients that are outputted for the region where the difference signal HV is 0 at the time of Lo image output, and outputs the generated coefficients to the LPF 503.

In Embodiment 4, the above configuration allows switching the LPF coefficients, upon output of the Lo image, between different LPF coefficients for regions with motion and regions without motion. In the Lo image, specifically, the region in which the high-frequency component is de-emphasized through substitution by a cos curve, is subjected to an LPF process of low smoothing effect, while other regions are subjected to an LPF process of high smoothing effect. As a result, this allows suppressing excessive smoothing in regions of substitution by a cos curve, in the Lo image, and allows for frame rate conversion of higher quality.

(Embodiment 5)

A fifth embodiment of the image-processing device and control method thereof according to the present invention will be explained next. The configuration of the image-processing device of Embodiment 5 is identical to that of the image-processing device of Embodiment 1 illustrated in FIG. 1. Embodiment 5 differs from Embodiment 1 as regards the configuration and function of the first image-generating unit 300. The explanation below will focus on differences with respect to Embodiment 1. An explanation on the details of the configuration and processes in Embodiment 1 will be omitted.

The first image-generating unit 300 receives the difference signal HV outputted by the signal-generating unit 200, and outputs the intermediate image data S3. In the case of a pixel the difference signal HV of which is 0 (pixel of small previous-next frame difference), the first image-generating unit 300 sets the intermediate image data S3 to the average value of the previous and next frames. In the case of a pixel the difference signal HV of which is other than 0 (pixel of large previous-next frame difference), a value resulting from correcting the average value of the previous and next frames is set as the intermediate image data S3.

Figure 15A:
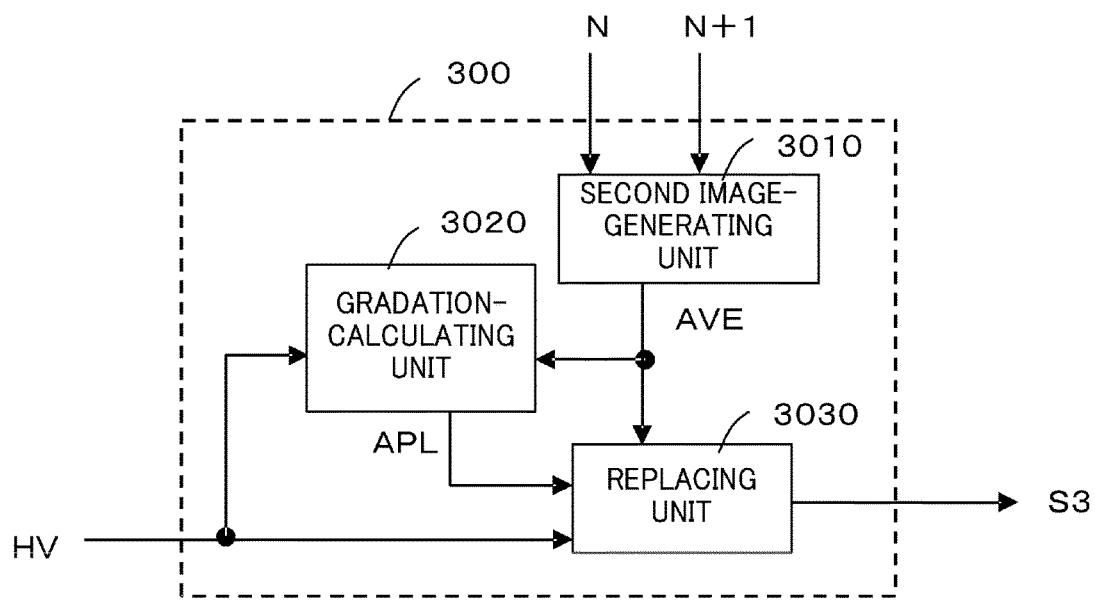
FIG. 15A and FIG. 15B are diagrams of an first image-generating unit 300 of Embodiment 5 and a distributing unit 500 of Embodiment 6.

The details of the first image-generating unit 300 will be explained next with reference to accompanying drawings. FIG. 15A is a block diagram of the first image-generating unit 300. The first image-generating unit 300 has a second image-generating unit 3010, a gradation-calculating unit 3020 and a replacing unit 3030.

The second image-generating unit 3010 generates an average image (first average image) in the N frame and the N+1 frame, and outputs the average image as an average image AVE.

On the basis of the difference signal HV and the average image AVE, the gradation-calculating unit 3020 calculates an intermediate gradation on the basis of surrounding pixels, in the horizontal direction or the vertical direction, of each pixel, and outputs the result as an intermediate gradation APL (second average image). The gradation-calculating unit 3020 calculates the intermediate gradation APL as described below, in accordance with the value of the difference signal HV.

$APL = 0(\text{case of } HV = 0)$ (Expression 9)

$= $ average value of the pixel values in the $AVE$ for a pixel within a predefined range(first range), in the horizontal direction, centered on the pixel of interest(case of $HV = 1$)

$= $ average value of the pixel values in the $AVE$ for a pixel within a predefined range(first range)

in the vertical direction, centered on the pixel of interest(case of $HV = 2$)

In Embodiment 5, the average value of the pixel values in the AVE for a pixel within a predefined range is set thus as the intermediate gradation, but the method for calculating the intermediate gradation is not limited thereto, and the intermediate gradation may be calculated using a median filter or the like.

The replacing unit 3030 corrects the average image AVE on the basis of the average image AVE, the intermediate gradation APL and the difference signal HV, and outputs the result as the intermediate image data S3.

In the case of difference signal HV=0 for the pixel of interest, the replacing unit 3030 outputs, as-is, the pixel value of the pixel of interest in the average image AVE, as the intermediate image data S3 of the pixel of interest.

The replacing unit 3030 performs the process below in the case of difference signal HV=1 for the pixel of interest (case where the pixel of interest is a pixel moving in the horizontal direction). The replacing unit 3030 calculates a difference absolute value between the pixel value of the pixel of interest for intermediate gradation APL and the pixel value of a pixel within a predefined range (second range), in the horizontal direction, centered on the pixel of interest of the average image AVE, for each pixel within the predefined range. Herein, the predefined range is set to [x−w, x+w] (w is a constant), where x is the coordinate of the pixel of interest. Specifically, the replacing unit 3030 calculates respective difference absolute values between APL(x, y), and AVE(x−w, y), AVE(x−w+1, y), . . . , AVE(x+w−1, y) and AVE(x+w, y) (w is a constant). The pixel value having the greatest difference absolute value with respect to the pixel value of the pixel of interest for the intermediate gradation APL, from among the pixel values of pixels within the predefined range of the average image AVE, is set as the pixel value in the intermediate image data S3 of the pixel of interest. That is, the replacing unit 3030 replaces the pixel of interest in the average image AVE of the motion region of HV=1 by a pixel in the average image AVE within a predefined range from the pixel of interest and such that the difference with respect to the APL is large. The intermediate image data S3 generated as a result of such replacement process is compared with the average image AVE, to narrow the range of intermediate pixel values in the motion region.

The replacing unit 3030 performs a process identical to that of the difference signal HV=1, in the vertical direction, for a pixel having difference signal HV=2 (pixel with motion in the vertical direction), and outputs the result as the intermediate image data S3.

FIG. 16A to FIG. 16C are diagrams for explaining the operation of the first image-generating unit 300. FIG. 16A illustrates an image at an N frame and an N+1 frame. In the N frame and N+1 frame, a white-square object moves from the left to the right against a black background, as illustrated in the figure. Herein, Q0 is set as the pixel value of the black background and Q1 as the pixel value of the object. FIG. 16B is a diagram illustrating the pixel values of pixels of one line denoted by line A in FIG. 16A. The shaded region in FIG. 16B is a horizontal motion region of difference signal HV=1.

FIG. 16C illustrates the average image AVE, the intermediate gradation APL and intermediate image data S3.

In the average image AVE of the N frame and N+1 frame as outputted by the second image-generating unit 3010, the pixel value for x<x0 is Q1, the pixel value for x0≤x≤x1 is the average value of Q1 and Q0, and the pixel value for x>x1 is Q0, as illustrated in FIG. 16C.

In the intermediate gradation APL outputted by the gradation-calculating unit 3020, the pixel value at the regions (x<x0, x1<x) of difference signal HV=0 is 0, as illustrated in FIG. 16C. The pixel value at the region (x0≤x≤x1) of difference signal HV=1 is the average value of the pixel values of the average image AVE within the predefined range in the horizontal direction centered on the pixel of interest, and takes on a value that decreases gradually, towards a small value, from a value that is larger than the average value of Q1 and Q0.

In the intermediate image data S3 outputted by the replacing unit 3030, the pixel value at the regions (x<x0, x1<x) of difference signal HV=0 takes on a value identical to that in the average image AVE, as illustrated in FIG. 16C. The pixel value at the region (x0≤x≤x1) of difference signal HV=1 takes on an pixel value of the average image APL for which the difference absolute value with respect to the pixel value of intermediate gradation APL of the pixel of interest is greatest within a predefined range in the horizontal direction. The region denoted by the arrow APL(xa) in the figure is a predefined range in the horizontal direction (range of ±w centered on the pixel of interest). In the region near x0, the pixel value of the average image AVE for which the difference absolute value with respect to the intermediate gradation APL is greatest is Q1, and hence the pixel value of the intermediate image data S3 is Q1. In the region near x1, the pixel value of the average image AVE for which the difference absolute value with respect to the intermediate gradation APL is greatest is Q0, and hence the pixel value of the intermediate image data S3 is Q0. If the pixel of interest is a pixel in the vicinity of the middle between x0 and x1, the predefined range (x±w) centered on the pixel of interest is set to be encompassed by the range x0 to x1. In this case, the pixel value of the average image AVE for which the difference absolute value with respect to the intermediate gradation APL is greatest is the average value of Q1 and Q0, and hence the pixel value of the intermediate image data S3 takes on the average value of Q1 and Q0. As a result, an image that changes into the background image, from the object image in the vicinity of the middle of the region of difference signal HV=1, is outputted as the intermediate image data S3, as illustrated in FIG. 16C. As illustrated in FIG. 16C, a comparison between the average image AVE and the intermediate image data S3 reveals that the region of intermediate pixel value between the pixel values Q1 and Q0 lies in the range x0 to x1, for the average image AVE, but lies within a narrower range for the intermediate image data S3. Thus, an intermediate image is generated such that the pixel value changes step-wise from one pixel value (Q1), from among Q1 as the pixel value of the pixel of the object adjacent to the boundary of the object and the background, and Q0 as the pixel value of the pixel of the background, to the other pixel value (Q0), in the motion direction of the object, within the motion region.

In the example illustrated in FIG. 16A to FIG. 16C an instance has been explained of an image where an object is moving the horizontal direction, but the example is not limited thereto. In the case of an image in which an image is moving in the vertical direction, there holds difference signal HV=2, and there is calculated an intermediate gradation from the surrounding pixels in the vertical direction. The replacing unit 3030 calculates a pixel value of an average image such that the difference absolute value with respect to the intermediate gradation is greatest, from pixels in a predefined range (range of y±w) in the vertical direction, and outputs the pixel value of the average image as the intermediate image.

FIG. 17A and FIG. 17B are diagrams illustrating an output image in a case of alternating output of the Hi image and the Lo image in Embodiment 5, and illustrating the appearance of the output image in the form of a waveform. FIG. 17A illustrates three frames Hi (i), Lo (i+0.5) and Hi (i+1) generated through execution of the process of Embodiment 5, on an image with motion towards the right in the horizontal direction. In the process of Embodiment 5 there is narrowed the region of the intermediate gradation that is generated through calculation of the average of the N frame and the N+1 frame. In the intermediate image data S3, as a result, the image at the boundary portion (edge portion) of the object and the background is disposed close to the center of the motion region. The positional shift of edge portions between sub-frames becomes smaller as a result, which makes it possible to suppress perception of motion blur during visual tracking, as illustrated in FIG. 17B.

(Embodiment 6)

A sixth embodiment of the image-processing device and control method thereof according to the present invention will be explained next. The characterizing feature of Embodiment 6, as compared with Embodiment 5, is that now the width of a vicinity region for reference during correction is modified in accordance with the speed of motion of the input image. Blocks that operate similarly to those of Embodiment 5 are denoted by the same reference symbols, and an explanation whereof will be omitted. The internal configuration and operation of the first image-generating unit 300 in Embodiment 6 are different from those of the first image-generating unit 300 in Embodiment 5.

Figure 15B:
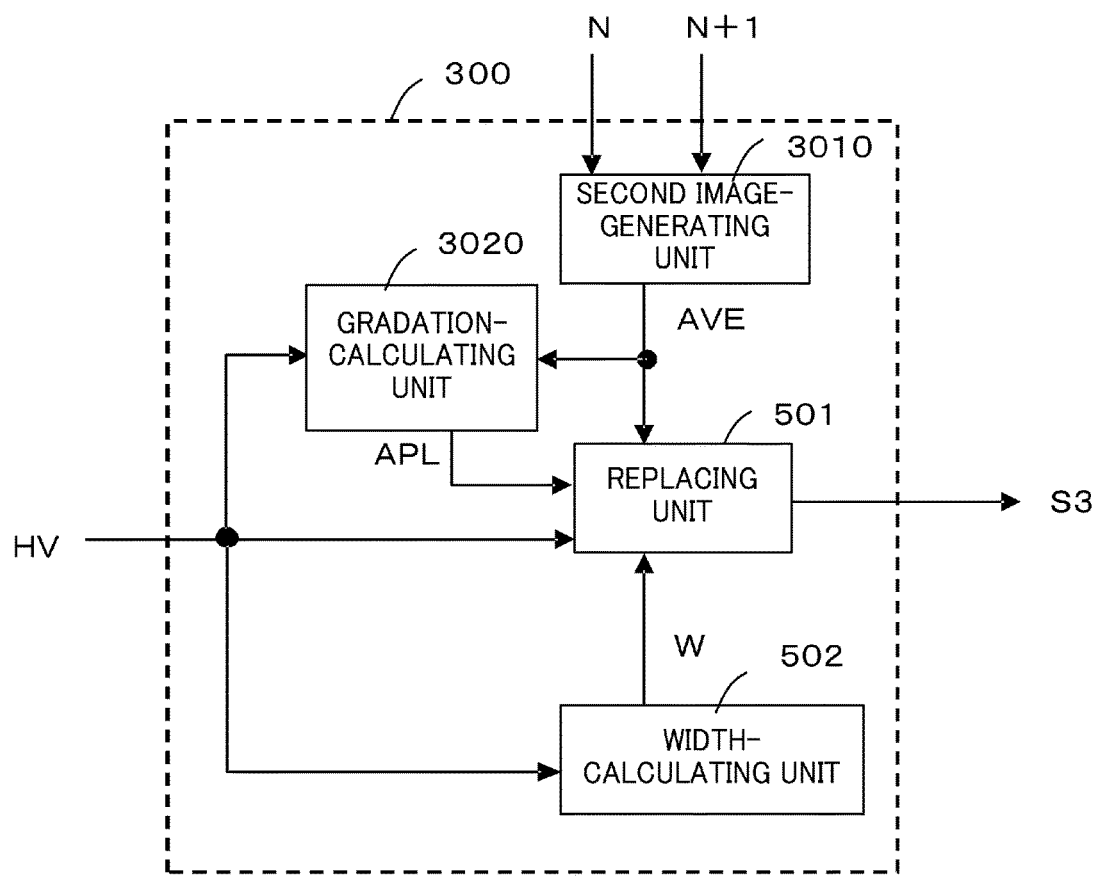

FIG. 15B is a block diagram of the first image-generating unit 300. The first image-generating unit 300 in Embodiment 6 differs from that of Embodiment 5 illustrated in FIG. 15A in that now the first image-generating unit 300 has additionally a width-calculating unit 502.

The replacing unit 501 performs a correction process on the average image AVE, using a vicinity region width W that is inputted from the width-calculating unit 502.

The replacing unit 501 performs a process as described below, in accordance with the difference signal HV.

In the case of difference signal HV=0 for the pixel of interest, the replacing unit 501 outputs, as-is, the pixel value of the pixel of interest in the average image AVE, as the intermediate image data S3 of the pixel of interest.

The replacing unit 501 performs the process below in the case of difference signal HV=1 for the pixel of interest (case where the pixel of interest is a pixel moving in the horizontal direction). The replacing unit 501 calculates a difference absolute value between the pixel value of intermediate gradation of the pixel of interest and the pixel value in the average image AVE of a pixel within a range of vicinity region width W centered on the pixel of interest, in the horizontal direction, for each pixel within the above range. Herein, the range of vicinity region width W is [x−W, x+W] (W is acquired from the width-calculating unit 502), where x is the coordinate of the pixel of interest. The replacing unit 501 calculates respective difference absolute values between APL(x, y) and AVE(x−W, y), AVE(x−W+1, y), . . . , AVE(x+W−1, y) and AVE(x+W, y). The pixel value of the average image AVE at the position at which the difference absolute value takes on a maximum value is outputted as the intermediate image data S3.

The replacing unit 501 performs a process identical to that in the case of a difference signal HV=1, in the vertical direction, for a pixel having difference signal HV=2 (pixel with motion in the vertical direction), and outputs the result as the intermediate image data S3.

The width-calculating unit 502 calculates a motion width, in the horizontal direction or vertical direction, from the difference signal HV, calculates the vicinity region width W from the motion width, and outputs the result. In Embodiment 6 the vicinity region width W is calculated on the basis of Expression 10 below.

$$W = 0 \text{(case of difference signal } HV = 0) \quad \text{(Expression 10)}$$
$$= \text{motion width}/2 \text{ in the horizontal direction(case of}$$
$$\text{difference signal } HV = 1)$$
$$= \text{motion width}/2 \text{ in the horizontal direction(case of}$$
$$\text{difference signal } HV = 1)$$

The motion width in the horizontal direction is calculated as follows. Firstly, there is calculated the x-coordinate values of both ends of the motion region in the horizontal direction. Herein, the x-coordinate values at both ends of the motion region, in the horizontal direction, are the x-coordinate values of pixels having a difference signal HV of 1 and being adjacent, in the horizontal direction, to a pixel having a difference signal HV that is not 1. A value resulting from adding 1 to the difference absolute value of the x-coordinate values of both ends in the horizontal direction thus calculated is set as the motion width in the horizontal direction. The motion width in the vertical direction is calculated in the same way as for the horizontal direction.

As a result, it becomes possible to correct the average image AVE of a fast-moving image by referring to a wide vicinity region, and to correct the average image AVE of a slow-moving image by referring to a narrow vicinity region. Embodiment 6 allows setting the vicinity region width W to an appropriate value in accordance with the image motion speed.

Figures 18A, 18B:
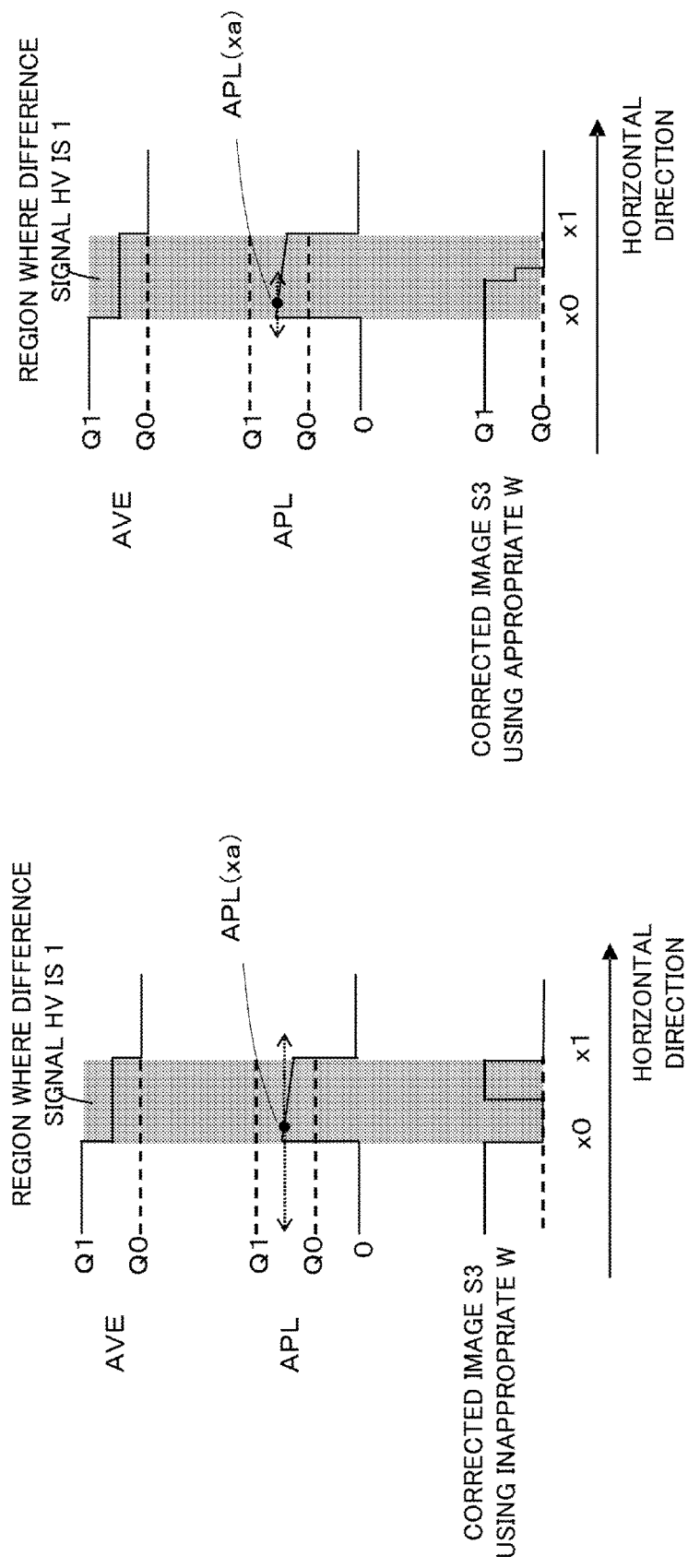
FIG. 18A and FIG. 18B are diagrams illustrating differences in processing results of an intermediate image depending on a vicinity region width W, in Embodiment 6.

FIG. 18A and FIG. 18B are diagrams illustrating the intermediate image data S3 in a case where image motion speed is corrected using an excessively large vicinity region width W, or using an appropriate vicinity region width W is used.

FIG. 18A is a diagram illustrating an instance where image motion speed is corrected using an excessively large vicinity region width W. As illustrated in FIG. 18A, the motion region of the intermediate image data S3 exhibits a waveform in which brightness fluctuates significantly. This arises from the fact that the pixel value of the average image AVE for which the difference absolute value with respect to the intermediate gradation APL(xa) of the pixel of interest is greatest is not AVE(x0), but AVE(x1), because the range of the average image AVE for calculation of the difference absolute value with respect to the intermediate gradation APL is excessively wide.

FIG. 18B, by contrast, is a diagram illustrating an instance where image motion speed is corrected using an appropriate vicinity region width W. As illustrated in FIG. 18B, the region of intermediate gradation becomes narrower and an image of the boundary portion (edge portion) of the object and the background is disposed close to the center of the motion region of the intermediate image data S3, thanks to the use of an appropriate vicinity region width W. This arises from the fact that the pixel value of the average image AVE for which the difference absolute value with respect to the intermediate gradation APL(xa) of the pixel of interest is greatest is AVE(x0), because the range of the average image AVE for calculation of the difference absolute value with respect to the intermediate gradation APL is appropriate.

Through calculation of an appropriate vicinity region width W in accordance with image motion speed, it becomes thus possible in Embodiment 6 to narrow properly the region of intermediate gradation, also in a case of fast image motion, and to suppress significant fluctuation of brightness of the intermediate image at a motion region, also in the case of slow image motion. Accordingly, motion blur can be reduced upon visual tracking, regardless of the image motion speed.

<Other Embodiments>

The present invention can be carried out also by a computer (or device such as a CPU or MPU) of a device or system that realizes the functions of the above-described embodiments through reading and execution of a program that is recorded on a storage device. Furthermore, for instance, the present invention can be carried out also in accordance with a method that comprises steps that are executed by a computer of a device or system that realizes the functions of the above-described embodiments through reading and execution of a program that is recorded on a storage device. To that end, the program may be supplied to the computer for instance via a network, or out of various types of recording media that can constitute the above storage device (i.e. a non-transitory computer-readable storage medium). Accordingly, the scope of the present invention includes any and all of the above computer (including devices such as a CPU, a MPU and the like), method, program (including program codes and program products) and computer-readable recording media in which the program is held non-transitorily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245280, filed on Nov. 27, 2013, which is hereby incorporated by reference herein in its entirety.

What is claimed is:

1. An image-processing device, comprising:
a detection unit configured to detect a motion region in which there is motion between an N-th frame image and an (N+1)-th frame image of an input image;
a generation unit configured to generate an intermediate image from the N-th frame image and the (N+1)-th frame image, on the basis of a detection result by the detection unit;
a processing unit configured to perform on the intermediate image processing of reducing a high-frequency component of spatial frequency; and
an output unit configured to output an image resulting from increasing a frame rate of the input image through insertion of the intermediate image having undergone the image processing, between a display image based on the N-th frame image and a display image based on the (N+1)-th frame image,
wherein when a target position at which a pixel value of the intermediate image is to be calculated is located within the motion region, the generation unit calculates a pixel value of the intermediate image at the target position on the basis of an average value of the pixel value of the N-th frame image and the pixel value of the (N+1)-th frame image at a position that is within a predefined range centered on the target position and outside the motion region.

2. The image-processing device according to claim 1, wherein the detection unit detects, as a motion region, a region at which the magnitude of an inter-frame difference, which is the difference between the pixel value of the N-th frame image and the pixel value of the (N+1)-th frame image, is equal to or greater than a predefined value.

3. The image-processing device according to claim 1, wherein when the target position is within the motion region, the generation unit calculates a pixel value of the intermediate image at the target position on the basis of an average value of the pixel value of the N-th frame image and the pixel value of the (N+1)-th frame image at a position that is within a predefined range centered on the target position, outside the motion region, and that is closest to the target position.

4. The image-processing device according to claim 1, wherein when there is no position that is within the predefined range centered on the target position and outside the motion region, the generation unit calculates a pixel value of the intermediate image at the target position on the basis of an average value of the pixel value of the N-th frame image and the pixel value of the (N+1)-th frame image at the target position.

5. The image-processing device according to claim 1, wherein the predefined range comprises a range that is set, from the target position, in a direction of motion as detected by the detection unit, and a range that is set, from the target position, in a direction opposite the direction of motion as detected by the detection unit.

6. The image-processing device according to claim 1, wherein when the target position is outside the motion region, the generation unit calculates a pixel value of the intermediate image at the target position on the basis of an average value of the pixel value of the N-th frame image and the pixel value of the (N+1)-th frame image at the target position.

7. The image-processing device according to claim 1, wherein the generation unit generates a plurality of intermediate images including a first intermediate image and a second intermediate image,
the generation unit using, in order to calculate a pixel value of each pixel of the first intermediate image, pixel values of the N-th frame image and the (N+1)-th frame image at a first position,
the generation unit using, in order to calculate a pixel value of each pixel of the second intermediate image, pixel values of the N-th frame image and the (N+1)-th frame image at a second position,
the first position and the second position being different from each other.

8. The image-processing device according to claim 7, wherein the generation unit sets the predefined range for each intermediate image in accordance with a time-axial position, between the N-th frame image and the (N+1)-th frame image, at which the intermediate image is inserted.

9. The image-processing device according to claim 8, wherein the predefined range comprises a range that is set, from the target position, in a direction of motion as detected by the detection unit, and a range that is set, from the target position, in a direction opposite the direction of motion as detected by the detection unit, such that the closer the time-axial position of insertion of the intermediate image is to the N-th frame image, the wider the range is in the direction of the motion, and the closer the time-axial position of insertion of the intermediate image is to the (N+1)-th frame image, the wider the range is in the direction opposite the direction of the motion.

10. The image-processing device according to claim 1, wherein the generation unit generates an intermediate image in which a pixel value varies continuously within the motion region, using a predefined interpolation function.

11. The image-processing device according to claim 10, wherein the processing unit causes a degree at which the high-frequency component of spatial frequency is reduced to be different between the motion region and other regions, in the intermediate image.

12. The image-processing device according to claim 1, wherein the generation unit generates an intermediate image in which a pixel value varies step-wise within the motion region.

13. The image-processing device according to claim 12, wherein the generation unit
further generates a first average image and a second average image from the N-th frame image and the (N+1)-th frame image;
calculates a pixel value of the first average image at a target position, at which a pixel value of the first average image is to be calculated, on the basis of an average value of the pixel value of the N-th frame image at the target position and the pixel value of the (N+1)-th frame image at the target position;
calculates a pixel value of the second average image at a target position, at which a pixel value of the second average image is to be calculated, on the basis of an average value of pixel values of the first average image within a first range centered on the target position, when the target position is within the motion region,;
sets, as a pixel value of the intermediate image at a target position, at which a pixel value of the intermediate image is to be calculated, a pixel value of the first average image at a position, from among positions within a second range centered on the target position, the magnitude of the difference between a pixel value of the first average image at the position and a pixel value of the second average image at the position being greatest, when the target position is within the motion region.

14. The image-processing device according to claim 13, wherein the first range and the second range comprise a range that is set, from the target position, in a direction of motion as detected by the detection unit, and a range that is set, from the target position, in a direction opposite the direction of motion as detected by the detection unit.

15. The image-processing device according to claim 13, wherein the second range is set in accordance with a speed of motion as detected by the detection unit.

16. The image-processing device according to claim 15, wherein the second range is set to be wider the faster the speed of motion as detected by the detection unit is.

17. The image-processing device according to claim 1, wherein
the processing unit further performs image processing of emphasizing the high-frequency component of spatial frequency on the N-th frame image and the (N+1)-th frame image; and
the output unit outputs an image resulting from increasing the frame rate of the input image through insertion of the intermediate image having undergone the image processing, between the N-th frame image and the (N+1)-th frame image having undergone the image processing.

18. A control method of an image-processing device, the method comprising:
detecting a motion region in which there is motion between an N-th frame image and an (N+1)-th frame image of an input image;
generating an intermediate image from the N-th frame image and the (N+1)-th frame image, on the basis of a detection result in the detecting process;
performing on the intermediate image processing of reducing a high-frequency component of spatial frequency; and
outputting an image resulting from increasing a frame rate of the input image through insertion of the intermediate image having undergone the image processing, between a display image based on the N-th frame image and a display image based on the (N+1)-th frame image,
wherein, in the generating process, when a target position at which a pixel value of the intermediate image is to be calculated is located within the motion region, a pixel value of the intermediate image at the target position is calculated on the basis of an average value of the pixel value of the N-th frame image and the pixel value of the (N+1)-th frame image at a position that is within a predefined range centered on the target position and outside the motion region.

19. The image-processing device according to claim 1, wherein, when a target position at which a pixel value of the intermediate image is to be calculated is located outside the motion region, the generation unit calculates a pixel value of the intermediate image at the target position, using a pixel value of the N-th frame image and the pixel value of the (N+1)-th frame image at the target position.

20. The control method according to claim 18, wherein, in the generating process, when a target position at which a pixel value of the intermediate image is to be calculated is located outside the motion region, a pixel value of the intermediate image at the target position is calculated using a pixel value of the N-th frame image and the pixel value of the (N+1)-th frame the image at the target position.

* * * * *